(12) United States Patent
Hsieh et al.

(10) Patent No.: US 8,736,984 B1
(45) Date of Patent: May 27, 2014

(54) IMAGE CAPTURING LENS ASSEMBLY

(71) Applicant: Largan Precision Co., Ltd., Taichung (TW)

(72) Inventors: Dung-Yi Hsieh, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 18 days.

(21) Appl. No.: 13/733,129

(22) Filed: Jan. 2, 2013

(30) Foreign Application Priority Data

Nov. 20, 2012 (TW) .............................. 101143309 A

(51) Int. Cl.
| | |
|---|---|
| G02B 9/60 | (2006.01) |
| G02B 13/00 | (2006.01) |
| G02B 13/02 | (2006.01) |
| G02B 9/00 | (2006.01) |
| G02B 9/62 | (2006.01) |
| G02B 9/64 | (2006.01) |

(52) U.S. Cl.
CPC ................ G02B 13/00 (2013.01); G02B 13/02 (2013.01); G02B 13/0045 (2013.01); G02B 9/00 (2013.01); G02B 9/60 (2013.01); G02B 9/62 (2013.01); G02B 9/64 (2013.01); G02B 13/001 (2013.01)
USPC ............ 359/764; 359/714; 359/715; 359/753

(58) Field of Classification Search
CPC .............. G02B 9/00; G02B 9/60; G02B 9/62; G02B 9/64; G02B 13/00; G02B 13/02; G02B 13/001; G02B 13/18; G02B 13/0045
USPC .................................. 359/713, 714, 746, 764
See application file for complete search history.

(56) References Cited

U.S. PATENT DOCUMENTS

| | | | | |
|---|---|---|---|---|
| 2013/0114151 | A1* | 5/2013 | Chen et al. ..................... | 359/714 |
| 2013/0182336 | A1* | 7/2013 | Hsu et al. ....................... | 359/714 |
| 2013/0201568 | A1* | 8/2013 | Tsai et al. ...................... | 359/714 |
| 2013/0314803 | A1* | 11/2013 | Huang et al. .................. | 359/714 |

* cited by examiner

Primary Examiner — Ricky Mack
Assistant Examiner — William Alexander
(74) Attorney, Agent, or Firm — CKC & Partners Co., Ltd.

(57) ABSTRACT

An image capturing lens assembly includes, in order from an object side to an image side, a first lens element, a second lens element, a third lens element, a fourth lens element and a fifth lens element. The first lens element with positive refractive power has an object-side surface being convex at a paraxial region thereof. The second lens element with refractive power has an object-side surface being convex at a paraxial region thereof. The third lens element has positive refractive power. The fourth lens element with negative refractive power has an object-side surface being concave at a paraxial region thereof and an image-side surface being convex at a paraxial region thereof. The fifth lens element with negative refractive power has an image-side surface being concave at a paraxial region thereof and being convex at a peripheral region thereof, wherein the surfaces of the fifth lens element are aspheric.

22 Claims, 20 Drawing Sheets

IMAGE CAPTURING LENS ASSEMBLY

RELATED APPLICATIONS

The application claims priority to Taiwan Application Serial Number 101143309, filed Nov. 20, 2012, which is herein incorporated by reference.

BACKGROUND

1. Technical Field

The present disclosure relates to an image capturing lens assembly. More particularly, the present disclosure relates to a compact image capturing lens assembly applicable to electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a structure of four-element lens such as the one disclosed in U.S. Pat. No. 8,179,470. Due to the popularity of mobile products with high-end specifications, such as smartphones and PDAs (Personal Digital Assistants), the requirements for high resolution and image quality of modern compact optical lens systems has been increasing significantly. However, the conventional four-element lens structure cannot satisfy these requirements of the compact optical lens system.

In another conventional optical lens system with five-element lens such as the ones disclosed in U.S. Pat. No. 8,000,030, however, the third lens element of the optical lens system do not have positive refractive power, so that the spherical aberration would be excessive because of the positive refractive power focus on one lens element and the distribution of the positive refractive power of the optical lens system cannot be balanced. Moreover, the fourth lens element and the fifth lens element do not both have negative refractive power, so that the back focal length cannot be reduced efficiently, and it is hard to apply to the compact optical lens assembly.

SUMMARY

According to one aspect of the present disclosure, an image capturing lens assembly includes, in order from an object side to an image side, a first lens element, a second lens element, a third lens element, a fourth lens element and a fifth lens element. The first lens element with positive refractive power has an object-side surface being convex at a paraxial region thereof. The second lens element with refractive power has an object-side surface being convex at a paraxial region thereof. The third lens element has positive refractive power. The fourth lens element with negative refractive power has an object-side surface being concave at a paraxial region thereof and an image-side surface being convex at a paraxial region thereof. The fifth lens element with negative refractive power has an image-side surface being concave at a paraxial region thereof and being convex at a peripheral region thereof, wherein an object-side surface and the image-side surface of the fifth lens element are aspheric. When a focal length of the first lens element is f1, a focal length of the third lens element is f3, a focal length of the fourth lens element is f4, a focal length of the fifth lens element is f5, an axial distance between the third lens element and the fourth lens element is T34, an axial distance between the fourth lens element and the fifth lens element is T45, and a central thickness of the fourth lens element is CT4, the following relationships are satisfied:

$$0 < f3/f1 < 0.85;$$

$$0 < f5/f4 < 0.85; \text{ and}$$

$$0 < (T34+T45)/CT4 < 0.75.$$

According to another aspect of the present disclosure, an image capturing lens assembly includes, in order from an object side to an image side, a first lens element, a second lens element, a third lens element, a fourth lens element and a fifth lens element. The first lens element with positive refractive power has an object-side surface being convex at a paraxial region thereof and an image-side surface being concave at a paraxial region thereof. The second lens element has refractive power. The third lens element has positive refractive power. The fourth lens element with negative refractive power has an object-side surface being concave at a paraxial region thereof and an image-side surface being convex at a paraxial region thereof. The fifth lens element with negative refractive power has an object-side surface being convex at a paraxial region thereof, and an image-side surface being concave at a paraxial region thereof and being convex at a peripheral region thereof, wherein the object-side surface and the image-side surface of the fifth lens element are aspheric. When a focal length of the first lens element is f1, a focal length of the third lens element is f3, a focal length of the fourth lens element is f4, a focal length of the fifth lens element is f5, an axial distance between the first lens element and the second lens element is T12, an axial distance between the second lens element and the third lens element is T23, a central thickness of the first lens element is CT1, and a central thickness of the third lens element is CT3, the following relationships are satisfied:

$$0 < f3/f1 < 0.75;$$

$$0 < f5/f4 < 0.85;$$

$$0 < T12/T23 < 1.20; \text{ and}$$

$$0.1 < CT3/CT1 < 1.20.$$

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
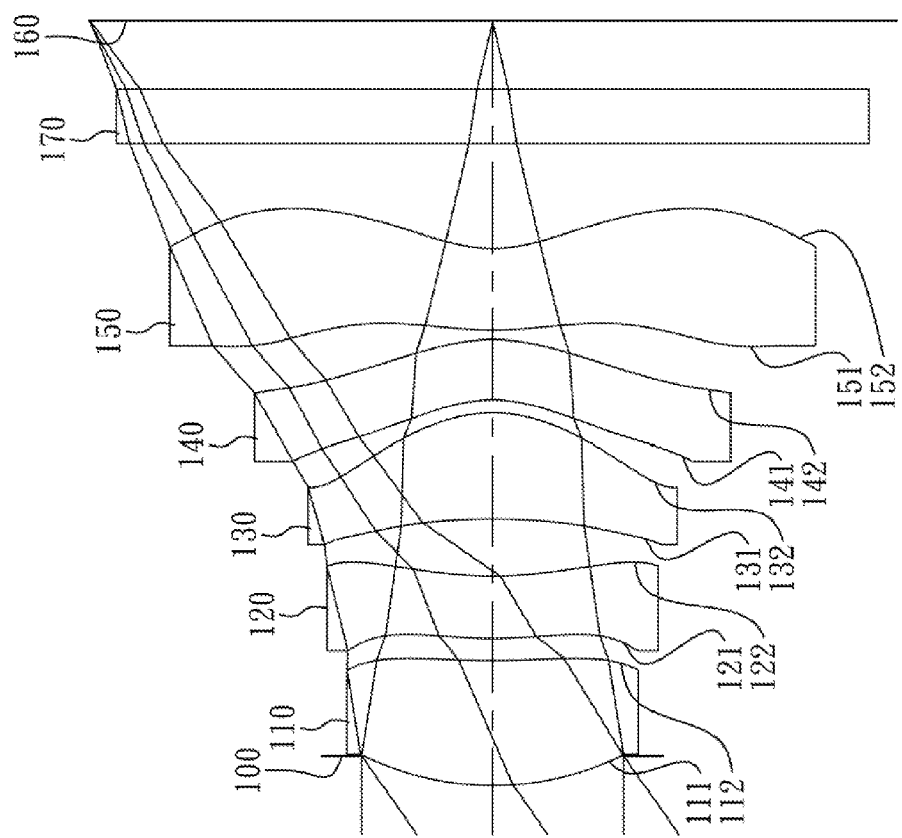
FIG. 1 is a schematic view of an image capturing lens assembly according to the 1st embodiment of the present disclosure.

An image capturing lens assembly includes, in order from an object side to an image side, a first lens element, a second lens element, a third lens element, a fourth lens element and a fifth lens element.

The first lens element with positive refractive power has an object-side surface being convex at a paraxial region thereof and an image-side surface being concave at a paraxial region thereof. Therefore, the total track length of the image capturing lens assembly can be reduced by the proper positive refractive power provided by the first lens element, and the astigmatism can be reduced.

The second lens element with negative refractive power has an object-side surface being convex at a paraxial region thereof, and can have an image-side surface being concave at a paraxial region thereof and being convex at a peripheral region thereof. Therefore, the aberration generated from the first lens element can be corrected, and the curvature of the surfaces can correct the astigmatism. Furthermore, the angle at which the incident light projects onto an image sensor from the off-axis field can be effectively reduced, and the aberration of the off-axis field can be further corrected.

The third lens element with positive refractive power can have an image-side surface being convex at a paraxial region thereof. Therefore, the distribution of the positive refractive power of the first lens element can be balanced for avoiding the excessive spherical aberration.

The fourth lens element with negative refractive power has an object-side surface being concave at a paraxial region thereof and an image-side surface being convex at a paraxial region thereof. Therefore, the aberration and the astigmatism of the image capturing lens assembly can be corrected.

The fifth lens element with negative refractive power has an object-side surface being convex at a paraxial region thereof, and has an image-side surface being concave at a paraxial region thereof and being convex at a paraxial region thereof. Therefore, the principal point of the image capturing lens assembly can be positioned away from an image plane, and the total track length of the image capturing lens assembly can be reduced while the back focal length can be reduced so as to maintain the compact size of the image capturing lens assembly.

When a focal length of the first lens element is f1, and a focal length of the third lens element is f3, the following relationship is satisfied:

$$0 < f3/f1 < 0.85.$$

The first lens element and the third lens element provide the main positive refractive power to the image capturing lens assembly. When the relationship is satisfied, the sensitivity in the refractive power distribution of the image capturing lens assembly can be reduced.

Preferably, the following relationship is satisfied:

$$0 < f3/f1 < 0.75.$$

When a focal length of the fourth lens element is f4, and a focal length of the fifth lens element is f5, the following relationship is satisfied:

$$0 < f5/f4 < 0.85.$$

Therefore, the proper distribution of the negative refractive power of the fourth lens element and the fifth lens element which are closest to the image plane can reduce the back focal length efficiently in compact lens assemblies.

Preferably, the following relationship is satisfied:

$$0 < f5/f4 < 0.70.$$

When an axial distance between the third lens element and the fourth lens element is T34, an axial distance between the fourth lens element and the fifth lens element is T45, and a central thickness of the fourth lens element is CT4, and the following relationship is satisfied:

$$0 < (T34+T45)/CT4 < 0.75.$$

By the proper arrangements of the distance between the lens elements and the thickness of the lens element, the assembling and the manufacture of the image capturing lens assembly can improve while maintaining the compact size thereof.

When a focal length of the image capturing lens assembly is f, and a curvature radius of the image-side surface of the fifth lens element is R10, the following relationship is satisfied:

$$0.1 < R10/f < 0.5.$$

Therefore, the back focal length can be reduced so as to maintain the compact size thereof.

When the focal length of the third lens element is f3, the focal length of the i-th lens element is fi, wherein i-th lens element can be the first, second, fourth, or fifth lens element, the following relationship is satisfied:

$$|f3/fi|<0.75,$$

wherein i=1, 2, 4, 5.

Therefore, the distribution of the refractive power can be balanced for avoiding the excessive spherical aberration and the aberration.

When the focal length of the image capturing lens assembly is f, and the focal length of the fifth lens element is f5, the following relationship is satisfied:

$$-1.7<f/f5<-0.6.$$

Therefore, the principal point of the image capturing lens assembly can be positioned away from an image plane, and the total track length of the image capturing lens assembly can be reduced while the back focal length is reduced so as to maintain the compact size of the image capturing lens assembly.

When an Abbe number of the second lens element is V2, and an Abbe number of the fourth lens element is V4, the following relationship is satisfied:

$$30<V2+V4<65.$$

Therefore, the chromatic aberration of the image capturing lens assembly can be corrected.

When a sum of central thicknesses of the first lens element, the second lens element, the third lens element, the fourth lens element and the fifth lens element is ΣCT, and an axial distance between the object-side surface of the first lens element and the image-side surface of the fifth lens element is Td, the following relationship is satisfied:

$$0.75<\Sigma CT/Td<0.92.$$

Therefore, the compact size of the image capturing lens assembly can be maintained by the proper distribution of the thicknesses of the lens elements.

When the central thickness of the first lens element is CT1, and the central thickness of the third lens element is CT3, the following relationship is satisfied:

$$0.4<CT3/CT1<1.0.$$

Therefore, the thicknesses of the lens elements are thereby favorable for manufacturing processes, such as the injection molding of the plastic material.

When an axial distance between the object-side surface of the first lens element and the image-side surface of the fifth lens element is Td, the following relationship is satisfied:

$$1.5\ mm<Td<3.0\ mm.$$

Therefore, the compact size of the image capturing lens assembly can be maintained for applying to the compact and portable electronic products.

When an axial distance between the first lens element and the second lens element is T12, and an axial distance between the second lens element and the third lens element is T23, the following relationship is satisfied:

$$0<T12/T23<1.20.$$

Therefore, the manufacturing yield rate can be increased by the proper assembling of the lens elements.

Preferably, the following relationship is satisfied:

$$0.1<T12/T23<1.0.$$

When a curvature radius of an object-side surface of the third lens element is R5, and a curvature radius of the image-side surface of the third lens element is R6, the following relationship is satisfied:

$$0.80<(R5+R6)/(R5-R6)<1.70.$$

Therefore, the spherical aberration and the aberration can be reduced.

According to the image capturing lens assembly of the present disclosure, the lens elements thereof can be made of plastic or glass material. When the lens elements are made of glass material, the distribution of the refractive power of the image capturing lens assembly may be more flexible to design. When the lens elements are made of plastic material, the manufacturing costs can be effectively reduced. Furthermore, the surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the image capturing lens assembly can also be reduced.

According to the image capturing lens assembly of the present disclosure, each of the object-side surface and the image-side surface of every lens element has a paraxial region and a peripheral region. The paraxial region refers to the region of the surface where light rays travel close to an optical axis and the peripheral region refers to the region of the surface where light rays travel away from the optical axis.

According to the image capturing lens assembly of the present disclosure, the image capturing lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop disposed between an object and the first lens element provides a longer distance from an exit pupil of the system to the image plane and thereby the generated telecentric effect improves the image-sensing efficiency of the image sensor. A middle stop disposed between the first lens element and the image plane is favorable for enlarging the field of view of the image capturing lens assembly and thereby provides a wider field of view for the same.

According to the image capturing lens assembly of the present disclosure, the image capturing lens assembly is featured with good correcting ability and high image quality, and can be applied to 3D (three-dimensional) image capturing applications, in products such as digital cameras, mobile devices and tablets.

According to the above description of the present disclosure, the following 1st-10th specific embodiments are provided for further explanation.

1st Embodiment

Figure 2:
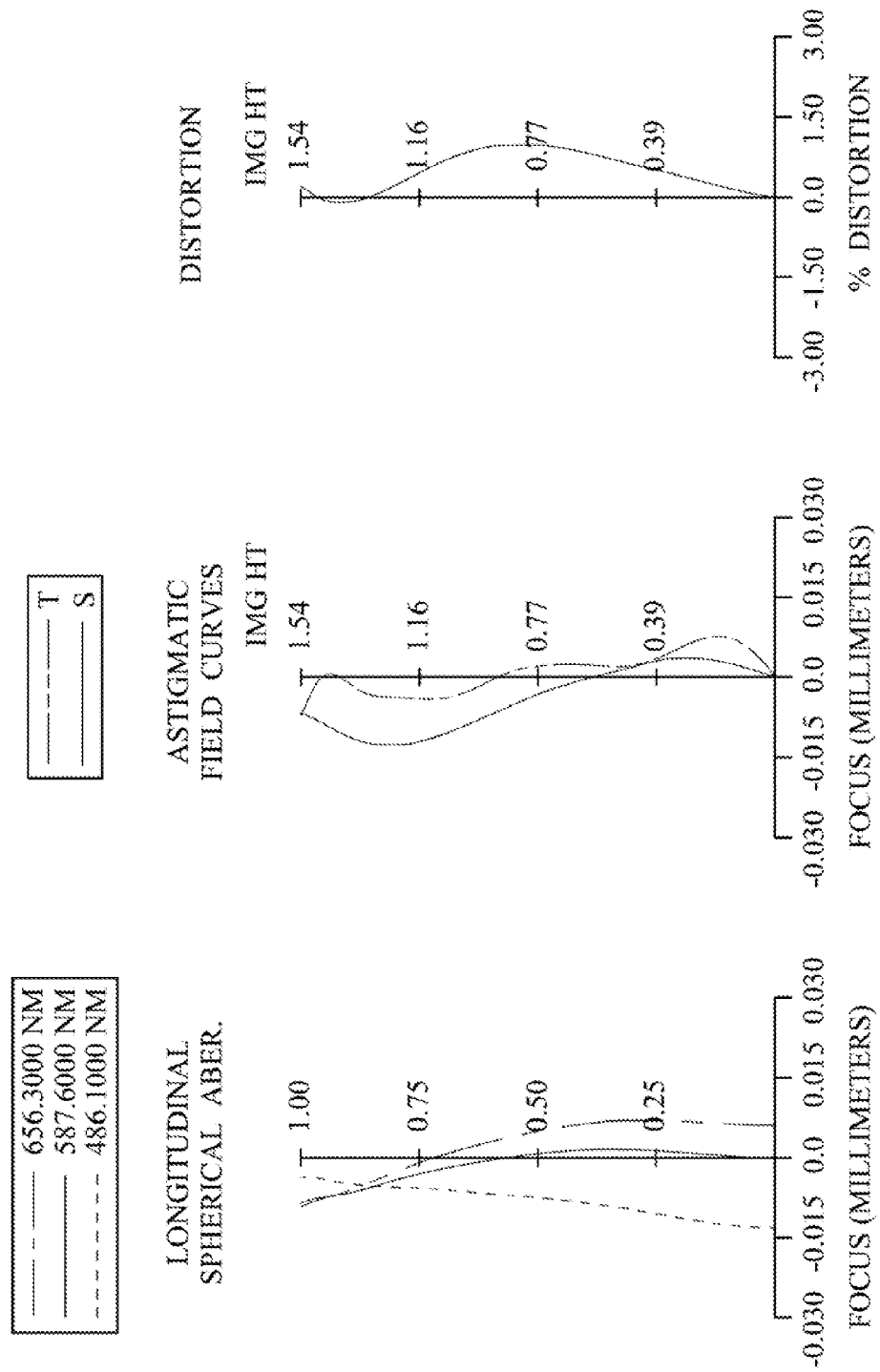
FIG. 2 shows spherical aberration curves, astigmatic field curves and a distortion curve of the image capturing lens assembly according to the 1st embodiment.

FIG. 1 is a schematic view of an image capturing lens assembly according to the 1st embodiment of the present disclosure. FIG. 2 shows spherical aberration curves, astigmatic field curves and a distortion curve of the image capturing lens assembly according to the 1st embodiment. In FIG. 1, the image capturing lens assembly includes, in order from an object side to an image side, an aperture stop 100, a first lens element 110, a second lens element 120, a third lens element 130, a fourth lens element 140, a fifth lens element 150, an IR-cut filter 170 and an image plane 160.

The first lens element 110 with positive refractive power has an object-side surface 111 being convex at a paraxial region thereof and an image-side surface 112 being concave at a paraxial region thereof. The first lens element 110 is made of plastic material, and has the object-side surface 111 and the image-side surface 112 both being aspheric.

The second lens element 120 with negative refractive power has an object-side surface 121 being convex at a paraxial region thereof, and has an image-side surface 122 being concave at a paraxial region thereof and being convex at a peripheral region thereof. The second lens element 120 is made of plastic material, and has the object-side surface 121 and the image-side surface 122 both being aspheric.

The third lens element 130 with positive refractive power has an object-side surface 131 being concave at a paraxial region thereof and an image-side surface 132 being convex at a paraxial region thereof. The third lens element 130 is made of plastic material, and has the object-side surface 131 and the image-side surface 132 both being aspheric.

The fourth lens element 140 with negative refractive power has an object-side surface 141 being concave at a paraxial region thereof and an image-side surface 142 being convex at a paraxial region thereof. The fourth lens element 140 is made of plastic material, and has the object-side surface 141 and the image-side surface 142 both being aspheric.

The fifth lens element 150 with negative refractive power has an object-side surface 151 being convex at a paraxial region thereof, and has an image-side surface 152 being concave at a paraxial region thereof and being convex at a peripheral region thereof. The fifth lens element 150 is made of plastic material, and has the object-side surface 151 and the image-side surface 152 both being aspheric.

The IR-cut filter 170 is made of glass material which located between the fifth lens element 150 and the image plane 160, and will not affect the focal length of the image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing lens assembly according to the 1st embodiment, when a focal length of the image capturing lens assembly is f, an f-number of the image capturing lens assembly is Fno, and half of the maximal field of view of the image capturing lens assembly is HFOV, these parameters have the following values:

f=2.20 mm;

Fno=2.20; and

HFOV=35.0 degrees.

In the image capturing lens assembly according to the 1st embodiment, when an Abbe number of the second lens element 120 is V2, and an Abbe number of the fourth lens element 140 is V4, the following relationship is satisfied:

$V2+V4=46.6$.

In the image capturing lens assembly according to the 1st embodiment, when a central thickness of the first lens element 110 is CT1, and a central thickness of the third lens element 130 is CT3, the following relationship is satisfied:

$CT3/CT1=0.851$.

In the image capturing lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and a central thickness of the fourth lens element 140 is CT4, the following relationships are satisfied:

$T12/T23=0.384$; and $(T34+T45)/CT4=0.370$.

In the image capturing lens assembly according to the 1st embodiment, when a sum of central thicknesses of the first lens element 110, the second lens element 120, the third lens element 130, the fourth lens element 140 and the fifth lens element 150 is ΣCT, and an axial distance between the object-side surface 111 of the first lens element 110 and the image-side surface 152 of the fifth lens element 150 is Td, the following relationships are satisfied:

$Td=2.053$ mm; and $\Sigma CT/Td=0.81$.

In the image capturing lens assembly according to the 1st embodiment, when a curvature radius of the object-side surface 131 of the third lens element 130 is R5, a curvature radius of the image-side surface 132 of the third lens element 130 is R6, the focal length of the image capturing lens assembly is f, and a curvature radius of the image-side surface 152 of the fifth lens element 150 is R10, the following relationships are satisfied:

$(R5+R6)/(R5-R6)=1.49$; and $R10/f=0.24$.

In the image capturing lens assembly according to the 1st embodiment, when a focal length of the first lens element 110 is f1, a focal length of the third lens element 130 is f3, a focal length of the fourth lens element 140 is f4, a focal length of the fifth lens element 150 is f5, and the focal length of the image capturing lens assembly is f, the following relationships are satisfied:

$f3/f1=0.397$;

$f/f5=-1.137$; and $f5/f4=0.343$.

In the image capturing lens assembly according to the 1st embodiment, when the focal length of the first lens element 110 is f1, a focal length of the second lens element 120 is f2, the focal length of the third lens element 130 is f3, the focal length of the fourth lens element 140 is f4, and the focal length of the fifth lens element 150 is f5, the following relationship is satisfied:

$|f3/fi|<0.75$, wherein i=1, 2, 4, 5.

The detailed optical data of the 1st embodiment are shown in Table 1 and the aspheric surface data are shown in Table 2 below.

TABLE 1

1st Embodiment
f = 2.20 mm, Fno = 2.20, HFOV = 35.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.113 | | | | |
| 2 | Lens 1 | 1.101 | (ASP) | 0.478 | Plastic | 1.544 | 55.9 | 2.89 |
| 3 | | 3.121 | (ASP) | 0.083 | | | | |
| 4 | Lens 2 | 1.864 | (ASP) | 0.240 | Plastic | 1.640 | 23.3 | −17.31 |
| 5 | | 1.515 | (ASP) | 0.216 | | | | |
| 6 | Lens 3 | −2.710 | (ASP) | 0.407 | Plastic | 1.544 | 55.9 | 1.15 |
| 7 | | −0.533 | (ASP) | 0.050 | | | | |
| 8 | Lens 4 | −0.505 | (ASP) | 0.230 | Plastic | 1.640 | 23.3 | −5.65 |
| 9 | | −0.691 | (ASP) | 0.035 | | | | |
| 10 | Lens 5 | 1.270 | (ASP) | 0.314 | Plastic | 1.544 | 55.9 | −1.94 |
| 11 | | 0.526 | (ASP) | 0.400 | | | | |
| 12 | IR-cut filter | Plano | | 0.210 | Glass | 1.517 | 64.2 | — |
| 13 | | Plano | | 0.260 | | | | |
| 14 | Image | Plano | | — | | | | |

Note:
Reference wavelength (d-line) is 587.6 nm.

TABLE 2

Aspheric Coefficients

| Surface # | 2 | 3 | 4 | 5 | 6 |
|---|---|---|---|---|---|
| k = | 6.8185E−02 | −1.1071E+01 | 1.1437E+00 | −3.5935E+00 | 9.6653E+00 |
| A4 = | −3.4942E−02 | −7.1038E−01 | −1.1115E+00 | −2.7888E−01 | −1.8867E−01 |
| A6 = | 1.5608E−01 | −1.8705E−01 | −1.2533E+00 | −8.3379E−01 | −8.4245E−01 |
| A8 = | −1.8348E+00 | −4.3020E−01 | 7.1371E+00 | 5.1713E−01 | 7.0788E+00 |
| A10 = | 6.6883E+00 | −2.5792E+00 | −2.8010E+00 | 1.1645E+01 | −6.1104E+00 |
| A12 = | −1.2813E+01 | 5.9571E+00 | 1.4036E+01 | −4.1108E+01 | −1.5580E+01 |
| A14 = | −1.4193E+00 | −1.0239E+01 | −1.7379E+01 | 3.1370E+01 | 3.8260E+01 |
| A16 = | | | | | −5.5416E+01 |

| Surface # | 7 | 8 | 9 | 10 | 11 |
|---|---|---|---|---|---|
| k = | −2.4832E+00 | −4.2013E+00 | −7.0608E+00 | −1.0985E+01 | −5.3251E+00 |
| A4 = | −7.4586E−02 | 5.4092E−01 | −1.7113E−01 | −1.4831E+00 | −7.0198E−01 |
| A6 = | −8.8073E−01 | −1.0471E+00 | 1.7708E+00 | 3.9120E+00 | 1.3104E+00 |
| A8 = | 3.4875E+00 | 4.4973E+00 | −5.3102E+00 | −7.8928E+00 | −2.0019E+00 |
| A10 = | −3.9241E+00 | −1.7842E+01 | 8.9472E+00 | 1.0971E+01 | 2.0475E+00 |
| A12 = | 6.4250E+00 | 3.6768E+01 | −8.2463E+00 | −8.9551E+00 | −1.3225E+00 |
| A14 = | −3.4349E+00 | −4.0530E+01 | 3.7361E+00 | 3.8499E+00 | 4.8229E−01 |
| A16 = | | 1.8901E+01 | −6.5689E−01 | −6.7661E−01 | −7.4214E−02 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
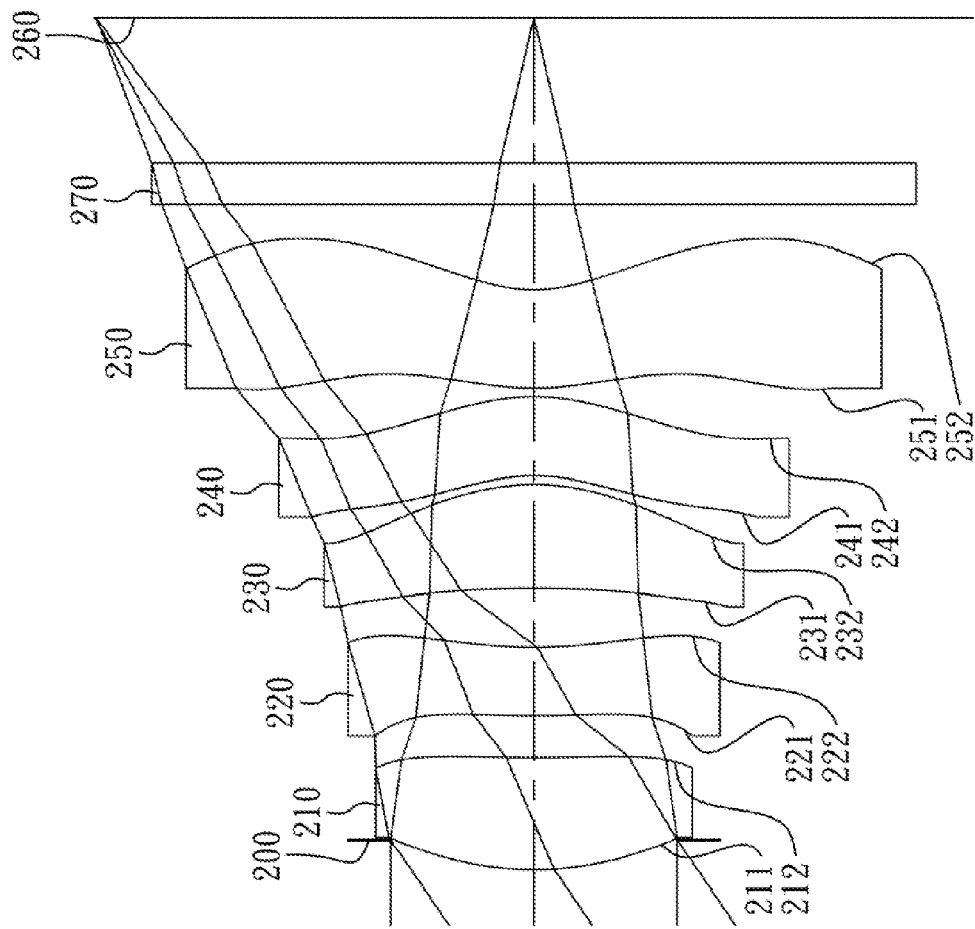
FIG. 3 is a schematic view of an image capturing lens assembly according to the 2nd embodiment of the present disclosure.
Figure 4:
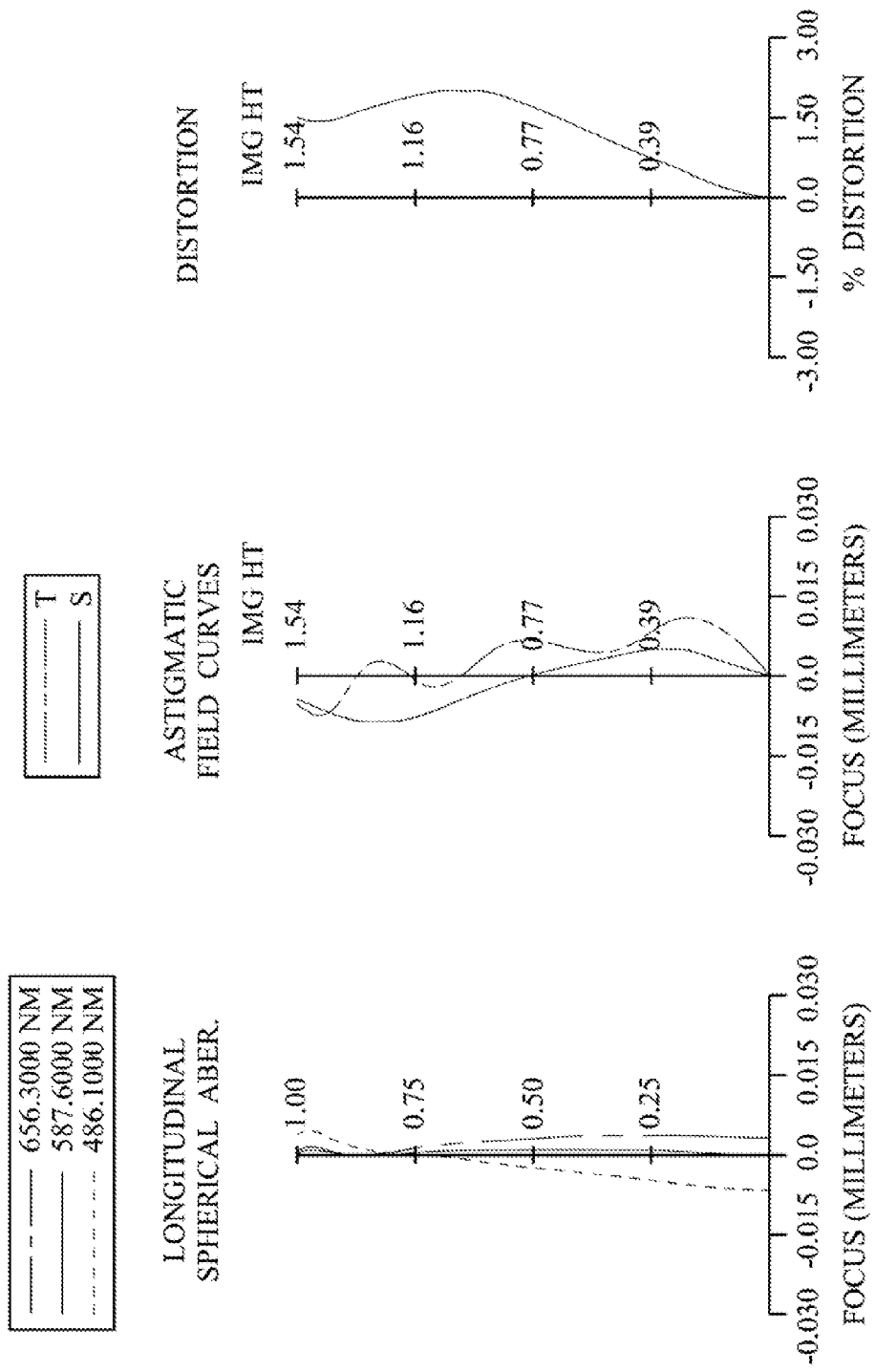
FIG. 4 shows spherical aberration curves, astigmatic field curves and a distortion curve of the image capturing lens assembly according to the 2nd embodiment.

FIG. 3 is a schematic view of an image capturing lens assembly according to the 2nd embodiment of the present disclosure. FIG. 4 shows spherical aberration curves, astigmatic field curves and a distortion curve of the image capturing lens assembly according to the 2nd embodiment. In FIG. 3, the image capturing lens assembly includes, in order from an object side to an image side, an aperture stop 200, a first lens element 210, a second lens element 220, a third lens element 230, a fourth lens element 240, a fifth lens element 250, an IR-cut filter 270 and an image plane 260.

The first lens element 210 with positive refractive power has an object-side surface 211 being convex at a paraxial region thereof and an image-side surface 212 being concave at a paraxial region thereof. The first lens element 210 is made of plastic material, and has the object-side surface 211 and the image-side surface 212 both being aspheric.

The second lens element 220 with negative refractive power has an object-side surface 221 being convex at a paraxial region thereof, and has an image-side surface 222 being concave at a paraxial region thereof and being convex at a peripheral region thereof. The second lens element 220 is made of plastic material, and has the object-side surface 221 and the image-side surface 222 both being aspheric.

The third lens element 230 with positive refractive power has an object-side surface 231 being concave at a paraxial region thereof and an image-side surface 232 being convex at a paraxial region thereof. The third lens element 230 is made of glass material, and has the object-side surface 231 and the image-side surface 232 both being aspheric.

The fourth lens element 240 with negative refractive power has an object-side surface 241 being concave at a paraxial region thereof and an image-side surface 242 being convex at a paraxial region thereof. The fourth lens element 240 is made of plastic material, and has the object-side surface 241 and the image-side surface 242 both being aspheric.

The fifth lens element 250 with negative refractive power has an object-side surface 251 being convex at a paraxial region thereof, and has an image-side surface 252 being concave at a paraxial region thereof and being convex at a peripheral region thereof. The fifth lens element 250 is made of plastic material, and has the object-side surface 251 and the image-side surface 252 both being aspheric.

The IR-cut filter 270 is made of glass material which located between the fifth lens element 250 and the image plane 260, and will not affect the focal length of the image capturing lens assembly.

The detailed optical data of the 2nd embodiment are shown in Table 3 and the aspheric surface data are shown in Table 4 below.

TABLE 3

2nd Embodiment
f = 2.21 mm, Fno = 2.20, HFOV = 34.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.105 | | | | |
| 2 | Lens 1 | 1.143 | (ASP) | 0.396 | Plastic | 1.535 | 55.7 | 2.52 |
| 3 | | 6.618 | (ASP) | 0.147 | | | | |
| 4 | Lens 2 | 3.567 | (ASP) | 0.240 | Plastic | 1.640 | 23.3 | −5.11 |
| 5 | | 1.661 | (ASP) | 0.206 | | | | |
| 6 | Lens 3 | −4.952 | (ASP) | 0.366 | Glass | 1.569 | 71.3 | 1.59 |
| 7 | | −0.787 | (ASP) | 0.030 | | | | |
| 8 | Lens 4 | −0.644 | (ASP) | 0.279 | Plastic | 1.640 | 23.3 | −92.92 |
| 9 | | −0.761 | (ASP) | 0.030 | | | | |
| 10 | Lens 5 | 0.995 | (ASP) | 0.346 | Plastic | 1.559 | 39.4 | −2.69 |
| 11 | | 0.524 | (ASP) | 0.300 | | | | |
| 12 | IR-cut filter | Plano | | 0.145 | Glass | 1.517 | 64.2 | — |
| 13 | | Plano | | 0.510 | | | | |
| 14 | Image | Plano | | — | | | | |

Note:
Reference wavelength (d-line) is 587.6 nm.

TABLE 4

Aspheric Coefficients

| Surface # | 2 | 3 | 4 | 5 | 6 |
|---|---|---|---|---|---|
| k = | 5.9745E−02 | 4.8054E+01 | 3.3681E+01 | −1.5049E+01 | 2.5554E+01 |
| A4 = | −3.1343E−02 | −4.1583E−01 | −9.9202E−01 | −1.5990E−01 | −1.8065E−01 |
| A6 = | 1.2092E−01 | −3.5059E−01 | −9.9855E−01 | −6.7281E−01 | −6.0813E−01 |
| A8 = | −2.3555E+00 | −8.1674E−01 | 9.4916E−01 | −6.8305E−01 | 5.9186E+00 |
| A10 = | 9.0326E−00 | −2.4746E+00 | −9.5665E+00 | 1.0276E+01 | −7.1403E+00 |
| A12 = | −1.9711E+01 | 1.6305E+00 | 1.2071E+01 | −3.2446E+01 | −1.5257E+01 |
| A14 = | −1.4193E+00 | 4.2244E+00 | −3.1300E−01 | 2.9974E+01 | 4.1075E+01 |
| A16 = | | | | | −3.1954E+01 |

| Surface # | 7 | 8 | 9 | 10 | 11 |
|---|---|---|---|---|---|
| k = | −3.5088E+00 | −5.6851E+00 | −6.3394E+00 | −3.8679E+00 | −4.3789E+00 |
| A4 = | 9.7008E−02 | 7.6010E−01 | −1.4847E−01 | −1.5670E+00 | −6.8090E−01 |
| A6 = | −9.0372E−01 | −1.2950E+00 | 1.9835E+00 | 3.9010E+00 | 1.2711E+00 |
| A8 = | 3.0360E+00 | 4.4755E+00 | −5.3879E+00 | −7.8633E+00 | −1.9733E+00 |
| A10 = | 4.6861E+00 | −1.7697E+01 | 8.2266E+00 | 1.0978E+01 | 2.0533E+00 |
| A12 = | 6.0840E+00 | 3.7206E+01 | −8.2889E+00 | −8.9606E+00 | −1.3297E+00 |
| A14 = | −3.0219E+00 | −4.0065E+01 | 3.7705E+00 | 3.8467E+00 | 4.7880E−01 |
| A16 = | | −1.7348E+01 | −5.9212E−01 | −6.7565E−01 | −7.2271E−02 |

In the image capturing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 2.21 | Td (mm) | 2.040 |
| Fno | 2.20 | ΣCT/Td | 0.80 |
| HFOV (deg.) | 34.5 | (R5 + R6)/(R5 − R6) | 1.38 |
| V2 + V4 | 46.6 | R10/f | 0.24 |
| CT3/T1 | 0.924 | f3/f1 | 0.632 |
| T12/T23 | 0.714 | f/f5 | −0.823 |
| (T34 + T45)/CT4 | 0.215 | f5/f4 | 0.029 |

Moreover, In the image capturing lens assembly according to the 2nd embodiment, when the focal length of the first lens element 210 is f1, the focal length of the second lens element 220 is f2, the focal length of the third lens element 230 is f3, the focal length of the fourth lens element 240 is f4, and the focal length of the fifth lens element 250 is f5, the following relationship is satisfied:

$|f3/fi| < 0.75$, wherein i=1, 2, 4, 5.

3rd Embodiment

Figure 5:
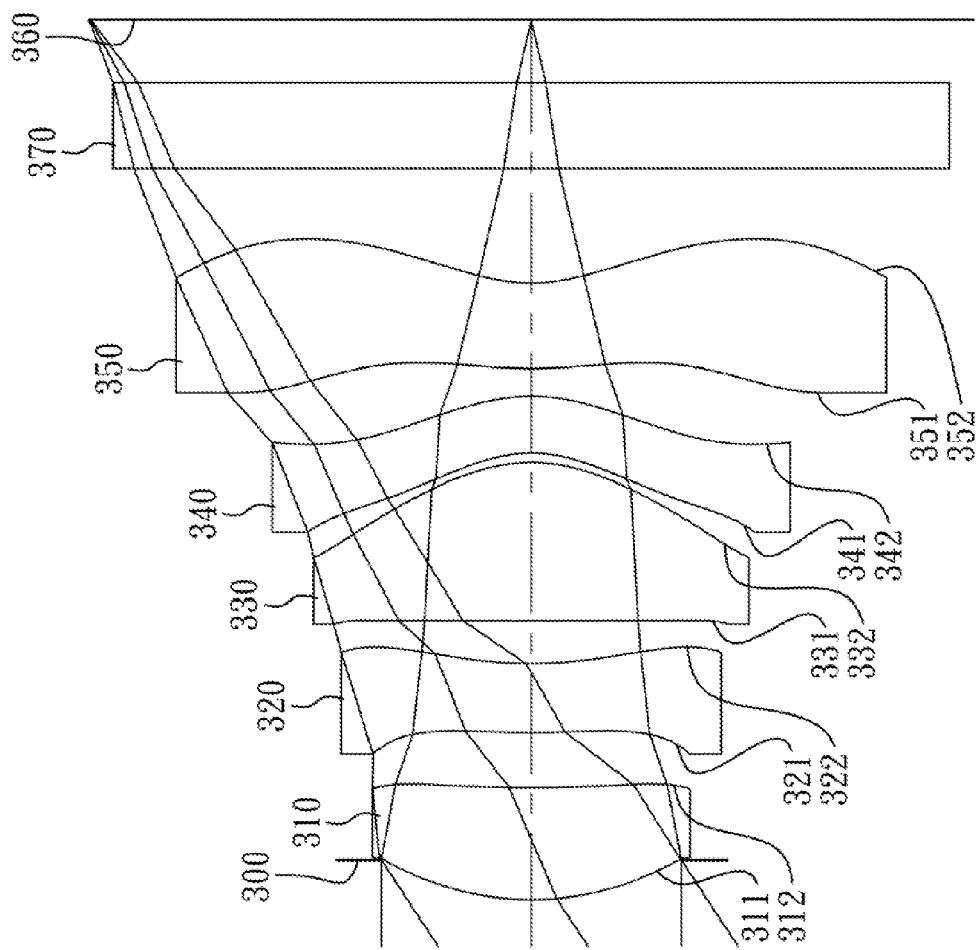
FIG. 5 is a schematic view of an image capturing lens assembly according to the 3rd embodiment of the present disclosure.
Figure 6:
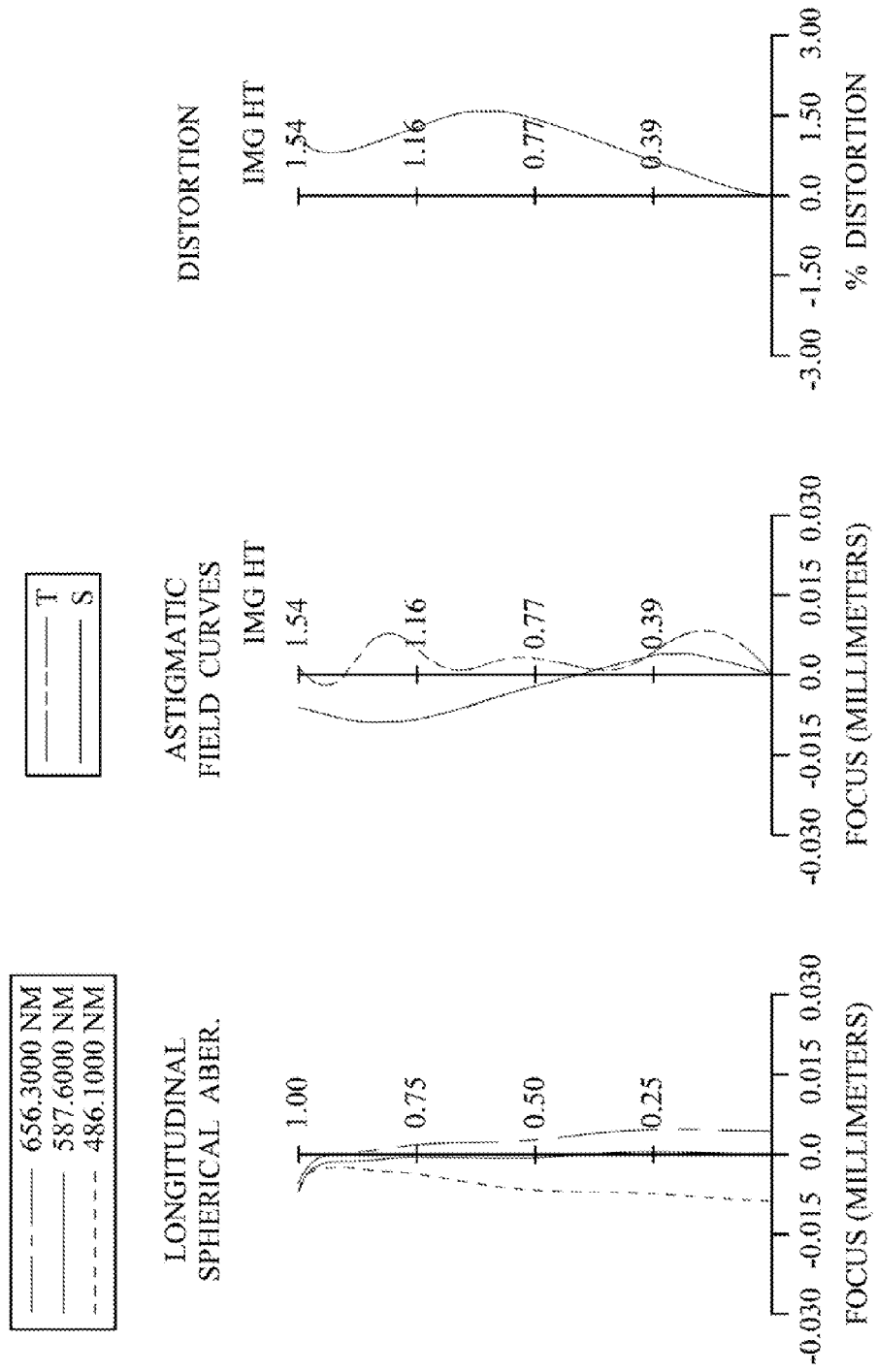
FIG. 6 shows spherical aberration curves, astigmatic field curves and a distortion curve of the image capturing lens assembly according to the 3rd embodiment.

FIG. 5 is a schematic view of an image capturing lens assembly according to the 3rd embodiment of the present disclosure. FIG. 6 shows spherical aberration curves, astigmatic field curves and a distortion curve of the image capturing lens assembly according to the 3rd embodiment. In FIG. 5, the image capturing lens assembly includes, in order from an object side to an image side, an aperture stop 300, a first lens element 310, a second lens element 320, a third lens element 330, a fourth lens element 340, a fifth lens element 350, an IR-cut filter 370 and an image plane 360.

The first lens element 310 with positive refractive power has an object-side surface 311 being convex at a paraxial region thereof and an image-side surface 312 being concave at a paraxial region thereof. The first lens element 310 is made of plastic material, and has the object-side surface 311 and the image-side surface 312 both being aspheric.

The second lens element 320 with negative refractive power has an object-side surface 321 being convex at a paraxial region thereof, and has an image-side surface 322 being concave at a paraxial region thereof and being convex at a peripheral region thereof. The second lens element 320 is made of plastic material, and has the object-side surface 321 and the image-side surface 322 both being aspheric.

The third lens element 330 with positive refractive power has an object-side surface 331 being convex at a paraxial region thereof and an image-side surface 332 being convex at a paraxial region thereof. The third lens element 330 is made of plastic material, and has the object-side surface 331 and the image-side surface 332 both being aspheric.

The fourth lens element 340 with negative refractive power has an object-side surface 341 being concave at a paraxial region thereof and an image-side surface 342 being convex at a paraxial region thereof. The fourth lens element 340 is made of plastic material, and has the object-side surface 341 and the image-side surface 342 both being aspheric.

The fifth lens element 350 with negative refractive power has an object-side surface 351 being convex at a paraxial region thereof, and has an image-side surface 352 being concave at a paraxial region thereof and being convex at a peripheral region thereof. The fifth lens element 350 is made of plastic material, and has the object-side surface 351 and the image-side surface 352 both being aspheric.

The IR-cut filter 370 is made of glass material which located between the fifth lens element 350 and the image plane 360, and will not affect the focal length of the image capturing lens assembly.

The detailed optical data of the 3rd embodiment are shown in Table 5 and the aspheric surface data are shown in Table 6 below.

TABLE 5

3rd Embodiment
f = 2.30 mm, Fno = 2.20, HFOV = 33.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.137 | | | | |
| 2 | Lens 1 | 1.039 | (ASP) | 0.392 | Plastic | 1.535 | 55.7 | 2.44 |
| 3 | | 4.389 | (ASP) | 0.193 | | | | |
| 4 | Lens 2 | 3.579 | (ASP) | 0.240 | Plastic | 1.640 | 23.3 | −3.61 |
| 5 | | 1.366 | (ASP) | 0.150 | | | | |
| 6 | Lens 3 | 88.229 | (ASP) | 0.552 | Plastic | 1.574 | 37.2 | 0.97 |
| 7 | | −0.560 | (ASP) | 0.033 | | | | |
| 8 | Lens 4 | −0.459 | (ASP) | 0.200 | Plastic | 1.640 | 23.3 | −4.91 |
| 9 | | −0.628 | (ASP) | 0.096 | | | | |
| 10 | Lens 5 | 1.626 | (ASP) | 0.300 | Plastic | 1.583 | 30.2 | −1.68 |
| 11 | | 0.570 | (ASP) | 0.400 | | | | |
| 12 | IR-cut | Plano | | 0.300 | Glass | 1.517 | 64.2 | — |
| 13 | | Plano | | 0.221 | | | | |
| 14 | Image | Plano | | — | | | | |

Note:
Reference wavelength (d-line) is 587.6 nm.

TABLE 6

Aspheric Coefficients

| Surface # | 2 | 3 | 4 | 5 | 6 |
|---|---|---|---|---|---|
| k = | 1.2141E−01 | 4.9993E+01 | 3.6063E+01 | −9.6466E+00 | 5.0000E+01 |
| A4 = | −2.7220E−03 | −2.6837E−01 | −1.0048E+00 | −1.8407E−01 | 1.7927E−02 |
| A6 = | 3.2053E−01 | −2.8432E−01 | −9.7577E−01 | −3.8202E−01 | −8.3856E−01 |
| A8 = | −2.5160E+00 | −7.6066E−01 | 1.5652E+00 | −9.9083E−01 | 4.7984E+00 |
| A10 = | 9.2329E+00 | −1.2268E+00 | −1.1527E+00 | 9.5252E+00 | −6.5062E+00 |
| A12 = | −1.5899E+01 | −8.8057E−00 | −6.3945E−01 | −3.0331E+01 | −1.2641E+01 |
| A14 = | −1.4301E+00 | −4.2028E+00 | −3.1412E−01 | 2.8245E+01 | 4.0660E+01 |
| A16 = | | | | | −3.5523E+01 |

| Surface # | 7 | 8 | 9 | 10 | 11 |
|---|---|---|---|---|---|
| k = | −2.8641E+00 | −3.2474E+00 | −5.3355E+00 | −2.1787E+00 | −5.3413E+00 |
| A4 = | 1.1773E−01 | 6.6901E−01 | −9.7207E−02 | −1.5887E+00 | −6.4899E−01 |
| A6 = | −9.9172E−01 | −1.1498E+00 | 1.9872E+00 | 3.8896E+00 | 1.2388E+00 |
| A8 = | 2.7677E+00 | 4.5827E+00 | −5.4583E+00 | −7.8500E+00 | −1.9676E+00 |
| A10 = | −5.0681E+00 | −1.8083E+01 | 8.8160E+00 | 1.0980E+01 | 2.0619E+00 |
| A12 = | 6.0736E+00 | 3.6775E+01 | −8.2354E+00 | −8.9628E+00 | −1.3318E+00 |
| A14 = | −2.5627E−00 | −3.9857E+01 | 3.8190E+00 | 3.8446E−00 | 4.7638E−01 |
| A16 = | | 1.7914E+01 | −6.3077E−01 | −6.7494E−01 | −7.1422E−02 |

In the image capturing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| f (mm) | 2.30 | Td (mm) | 2.156 |
|---|---|---|---|
| Fno | 2.20 | ΣT/Td | 0.78 |
| HFOV (deg.) | 33.5 | (R5 + R6)/(R5 − R6) | 0.99 |
| V2 + V4 | 46.6 | R10/f | 0.25 |
| CT3/CT1 | 1.408 | f3/f1 | 0.398 |
| T12/T23 | 1.287 | 5 | −1.370 |
| (T34 + T45)/CT4 | 0.645 | f5/f4 | 0.342 |

Moreover, In the image capturing lens assembly according to the 3rd embodiment, when the focal length of the first lens element 310 is f1, the focal length of the second lens element 320 is f2, the focal length of the third lens element 330 is f3, the focal length of the fourth lens element 340 is f4, and the focal length of the fifth lens element 350 is f5, the following relationship is satisfied:

$|f3/fi|<0.75$, wherein i=1, 2, 4, 5.

4th Embodiment

Figure 7:
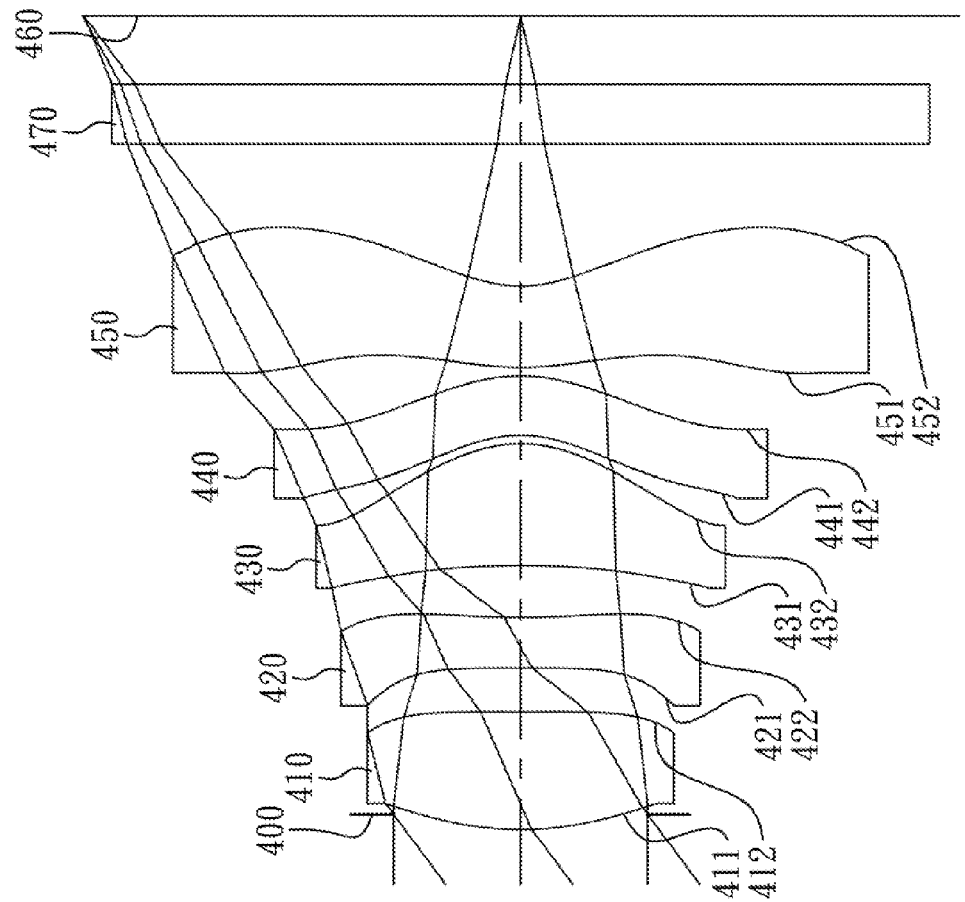
FIG. 7 is a schematic view of an image capturing lens assembly according to the 4th embodiment of the present disclosure.
Figure 8:
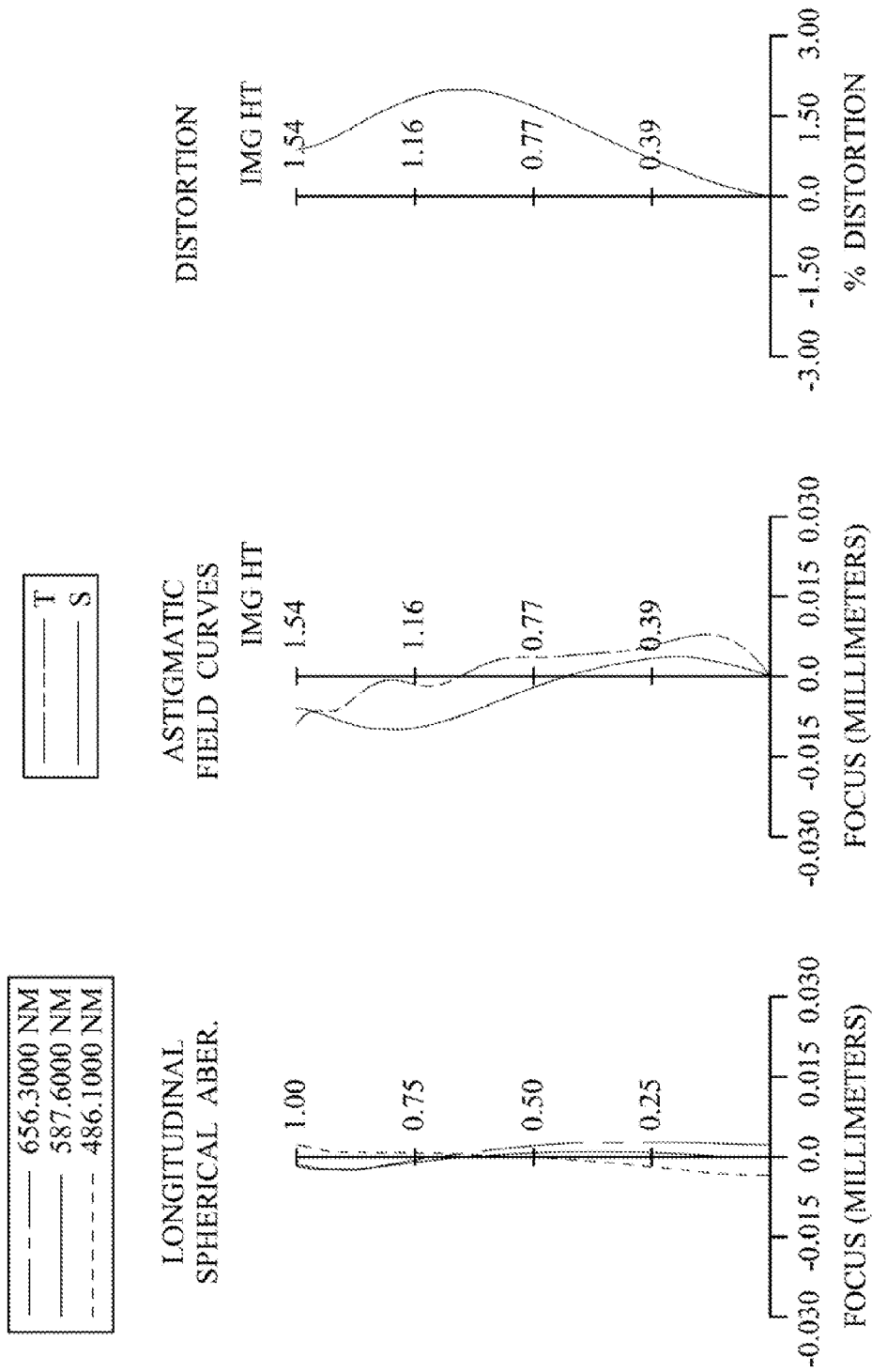
FIG. 8 shows spherical aberration curves, astigmatic field curves and a distortion curve of the image capturing lens assembly according to the 4th embodiment.

FIG. 7 is a schematic view of an image capturing lens assembly according to the 4th embodiment of the present disclosure. FIG. 8 shows spherical aberration curves, astigmatic field curves and a distortion curve of the image capturing lens assembly according to the 4th embodiment. In FIG. 7, the image capturing lens assembly includes, in order from an object side to an image side, an aperture stop 400, a first lens element 410, a second lens element 420, a third lens element 430, a fourth lens element 440, a fifth lens element 450, an IR-cut filter 470 and an image plane 460.

The first lens element 410 with positive refractive power has an object-side surface 411 being convex at a paraxial region thereof and an image-side surface 412 being concave at a paraxial region thereof. The first lens element 410 is made of plastic material, and has the object-side surface 411 and the image-side surface 412 both being aspheric.

The second lens element 420 with negative refractive power has an object-side surface 421 being convex at a paraxial region thereof, and has an image-side surface 422 being concave at a paraxial region thereof and being convex at a peripheral region thereof. The second lens element 420 is made of plastic material, and has the object-side surface 421 and the image-side surface 422 both being aspheric.

The third lens element 430 with positive refractive power has an object-side surface 431 being concave at a paraxial region thereof and an image-side surface 432 being convex at a paraxial region thereof. The third lens element 430 is made of plastic material, and has the object-side surface 431 and the image-side surface 432 both being aspheric.

The fourth lens element 440 with negative refractive power has an object-side surface 441 being concave at a paraxial region thereof and an image-side surface 442 being convex at a paraxial region thereof. The fourth lens element 440 is made of plastic material, and has the object-side surface 441 and the image-side surface 442 both being aspheric.

The fifth lens element 450 with negative refractive power has an object-side surface 451 being convex at a paraxial region thereof, and has an image-side surface 452 being concave at a paraxial region thereof and being convex at a peripheral region thereof. The fifth lens element 450 is made of plastic material, and has the object-side surface 451 and the image-side surface 452 both being aspheric.

The IR-cut filter 470 is made of glass material which located between the fifth lens element 450 and the image plane 460, and will not affect the focal length of the image capturing lens assembly.

The detailed optical data of the 4th embodiment are shown in Table 7 and the aspheric surface data are shown in Table 8 below.

TABLE 7

4th Embodiment
f = 2.07 mm, Fno = 2.32, HFOV = 36.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.052 | | | | |
| 2 | Lens 1 | 1.182 | (ASP) | 0.414 | Plastic | 1.544 | 55.9 | 2.21 |
| 3 | | 53.707 | (ASP) | 0.152 | | | | |
| 4 | Lens 2 | 75.277 | (ASP) | 0.180 | Plastic | 1.640 | 23.3 | −4.49 |
| 5 | | 2.762 | (ASP) | 0.131 | | | | |
| 6 | Lens 3 | −3.118 | (ASP) | 0.429 | Plastic | 1.544 | 55.9 | 0.95 |
| 7 | | −0.466 | (ASP) | 0.030 | | | | |
| 8 | Lens 4 | −0.442 | (ASP) | 0.211 | Plastic | 1.640 | 23.3 | −7.45 |
| 9 | | −0.577 | (ASP) | 0.030 | | | | |
| 10 | Lens 5 | 1.136 | (ASP) | 0.266 | Plastic | 1.544 | 55.9 | −1.54 |
| 11 | | 0.440 | (ASP) | 0.500 | | | | |
| 12 | IR-cut filter | Plano | | 0.210 | Glass | 1.517 | 64.2 | — |
| 13 | | Plano | | 0.241 | | | | |
| 14 | Image | Plano | | — | | | | |

Note:
Reference wavelength (d-line) is 587.6 nm.

TABLE 8

Aspheric Coefficients

| Surface # | 2 | 3 | 4 | 5 | 6 |
|---|---|---|---|---|---|
| k = | 3.5253E−02 | −5.0000E+01 | −5.0000E+01 | −3.1389E+01 | 4.6525E+00 |
| A4 = | −6.3647E−02 | −4.9438E−01 | −1.1266E+00 | −3.9358E−01 | 3.7335E−02 |
| A6 = | −5.0094E−02 | −9.1485E−01 | −1.8334E+00 | −1.0683E+00 | −1.5553E+00 |
| A8 = | −2.2571E+00 | −1.7573E+00 | 2.1861E−01 | −3.9119E−01 | 6.6095E+00 |
| A10 = | 4.9007E+00 | −6.7320E−01 | −8.9210E+00 | 1.2921E+01 | −5.4612E+00 |
| A12 = | 1.4787E+00 | 6.4203E+00 | 4.3983E+01 | −3.4440E+01 | −1.5367E+01 |
| A14 = | −7.5160E+01 | −2.1648E+01 | −1.7379E+01 | 2.7707E+01 | 3.9181E+01 |
| A16 = | | | | | −3.5235E+01 |

| Surface # | 7 | 8 | 9 | 10 | 11 |
|---|---|---|---|---|---|
| k = | −2.5456E+00 | −3.1156E+00 | −4.9975E+00 | −3.5027E+00 | −4.2606E+00 |
| A4 = | 1.0987E−01 | 7.4528E−01 | −1.5961E−01 | −1.5560E+00 | −6.7119E−01 |
| A6 = | −9.0271E−01 | −6.9356E−01 | 2.0818E+00 | 3.8907E+00 | 1.2755E+00 |
| A8 = | 3.3358E+00 | 3.9073E+00 | −5.4297E+00 | −7.8784E+00 | −1.9828E+00 |
| A10 = | 4.0214E+00 | −1.8505E+01 | 8.7844E+00 | 1.0982E+01 | 2.0535E+00 |
| A12 = | 5.8774E+00 | 3.7861E+01 | −8.3033E+00 | −8.9512E+00 | −1.3266E+00 |
| A14 = | −4.2413E+00 | −3.8620E+01 | 3.7886E+00 | 3.8487E+00 | 4.7873E−01 |
| A16 = | | 1.5868E+01 | −5.8494E−01 | −6.8053E−01 | −7.2937E−02 |

In the image capturing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| f (mm) | 2.07 | Td (mm) | 1.913 |
|---|---|---|---|
| Fno | 2.32 | ΣCT/Td | 0.79 |
| HFOV (deg.) | 36.4 | (R5 + R6)/(R5 − R6) | 1.35 |
| V2 + V4 | 46.6 | R10/f | 0.21 |
| CT3/CT1 | 1.036 | f3/f1 | 0.430 |
| T12/T23 | 0.840 | f/f5 | −1.346 |
| (T34 + T45)/CT4 | 0.284 | f5/f4 | 0.207 |

Moreover, In the image capturing lens assembly according to the 4th embodiment, when the focal length of the first lens element 410 is f1, the focal length of the second lens element 420 is f2, the focal length of the third lens element 430 is f3, the focal length of the fourth lens element 440 is f4, and the focal length of the fifth lens element 450 is f5, the following relationship is satisfied:

$$|f3/fi|<0.75,$$

wherein i=1, 2, 4, 5.

5th Embodiment

Figure 9:
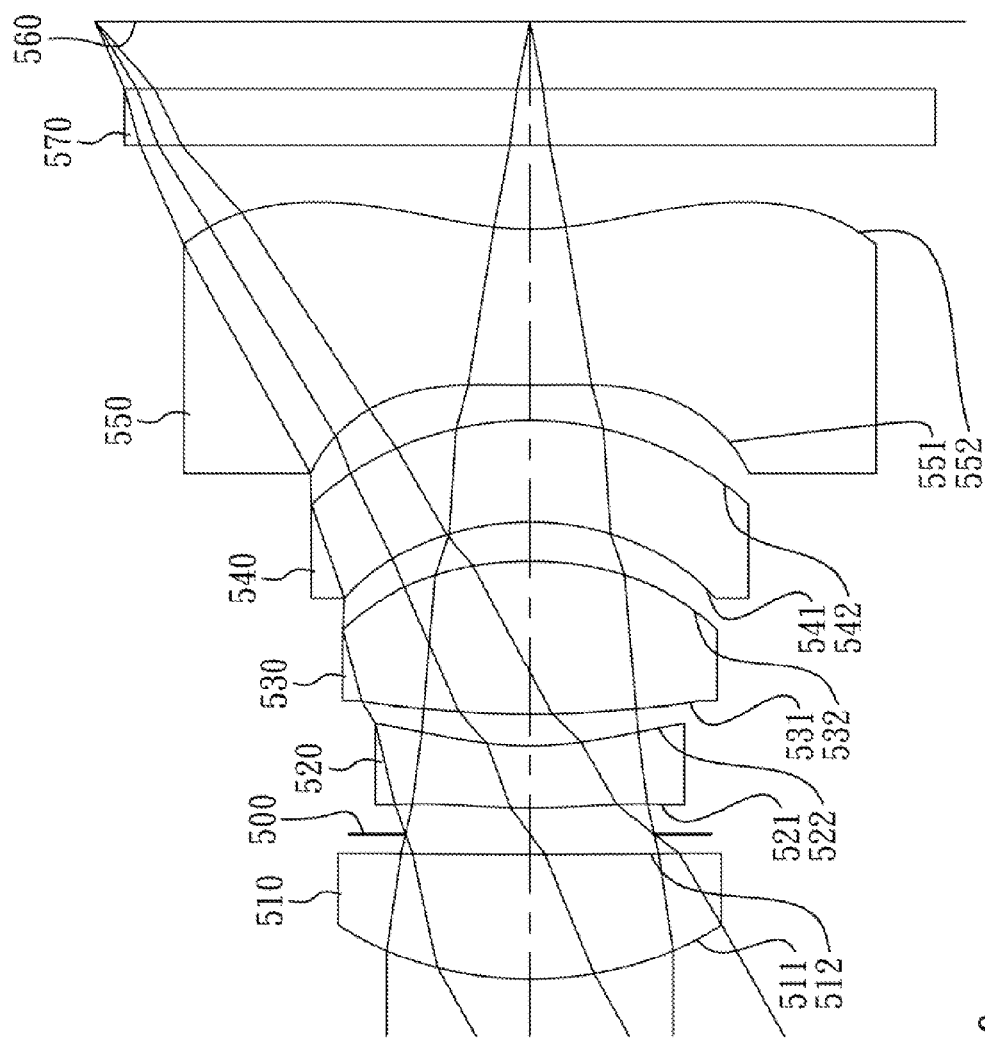
FIG. 9 is a schematic view of an image capturing lens assembly according to the 5th embodiment of the present disclosure.
Figure 10:
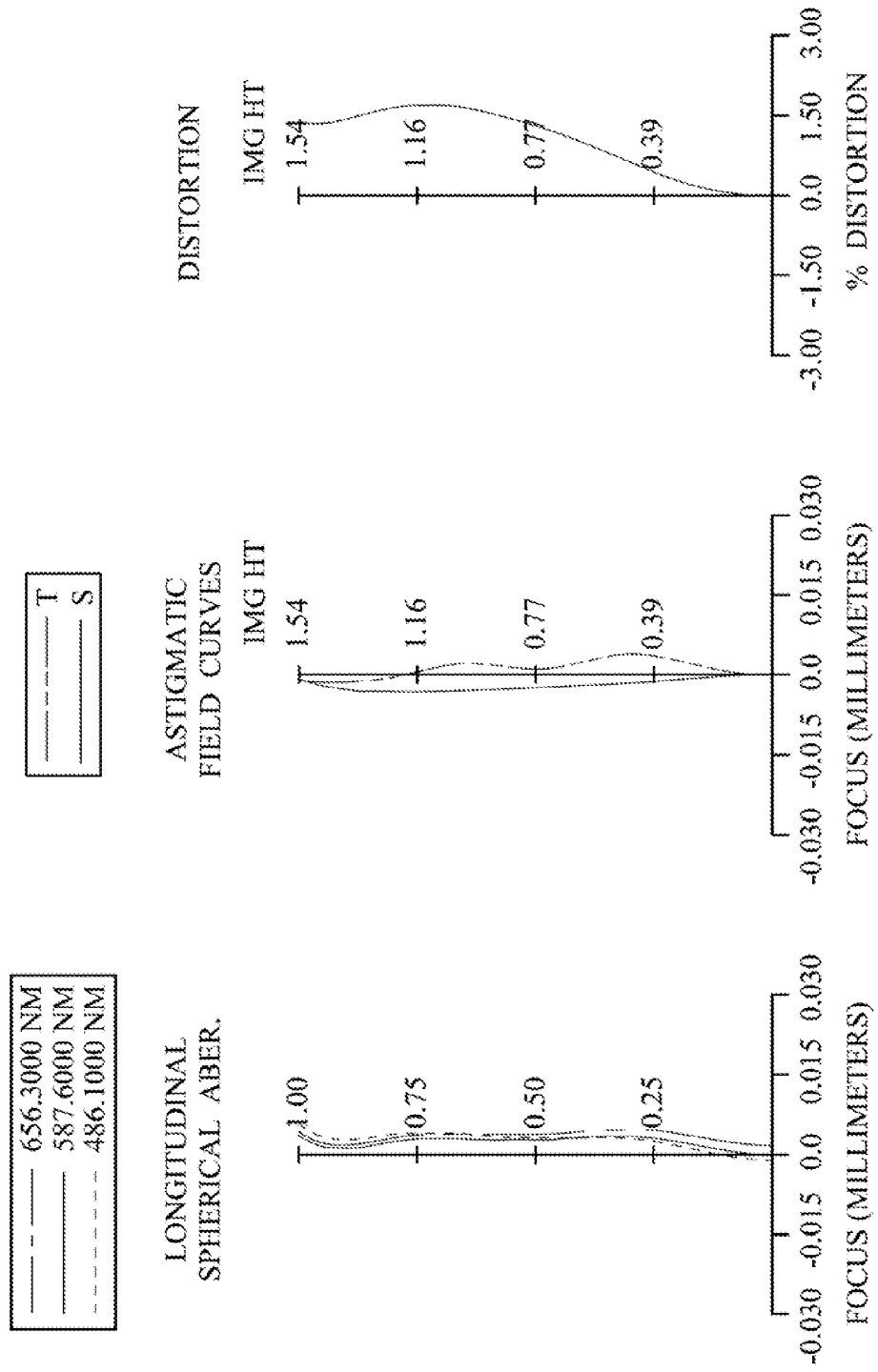
FIG. 10 shows spherical aberration curves, astigmatic field curves and a distortion curve of the image capturing lens assembly according to the 5th embodiment.

FIG. 9 is a schematic view of an image capturing lens assembly according to the 5th embodiment of the present disclosure. FIG. 10 shows spherical aberration curves, astigmatic field curves and a distortion curve of the image capturing lens assembly according to the 5th embodiment. In FIG. 9, the image capturing lens assembly includes, in order from an object side to an image side, a first lens element 510, an aperture stop 500, a second lens element 520, a third lens element 530, a fourth lens element 540, a fifth lens element 550, an IR-cut filter 570 and an image plane 560.

The first lens element 510 with positive refractive power has an object-side surface 511 being convex at a paraxial region thereof and an image-side surface 512 being concave at a paraxial region thereof. The first lens element 510 is made of plastic material, and has the object-side surface 511 and the image-side surface 512 both being aspheric.

The second lens element 520 with negative refractive power has an object-side surface 521 being convex at a paraxial region thereof, and has an image-side surface 522 being concave at a paraxial region thereof and being convex at a peripheral region thereof. The second lens element 520 is made of plastic material, and has the object-side surface 521 and the image-side surface 522 both being aspheric.

The third lens element 530 with positive refractive power has an object-side surface 531 being convex at a paraxial region thereof and an image-side surface 532 being convex at a paraxial region thereof. The third lens element 530 is made of plastic material, and has the object-side surface 531 and the image-side surface 532 both being aspheric.

The fourth lens element 540 with negative refractive power has an object-side surface 541 being concave at a paraxial region thereof and an image-side surface 542 being convex at a paraxial region thereof. The fourth lens element 540 is made of plastic material, and has the object-side surface 541 and the image-side surface 542 both being aspheric.

The fifth lens element 550 with negative refractive power has an object-side surface 551 being convex at a paraxial region thereof, and has an image-side surface 552 being concave at a paraxial region thereof and being convex at a peripheral region thereof. The fifth lens element 550 is made of plastic material, and has the object-side surface 551 and the image-side surface 552 both being aspheric.

The IR-cut filter 570 is made of glass material which located between the fifth lens element 550 and the image plane 560, and will not affect the focal length of the image capturing lens assembly.

The detailed optical data of the 5th embodiment are shown in Table 9 and the aspheric surface data are shown in Table 10 below.

TABLE 9

5th Embodiment
f = 2.69 mm, Fno = 2.65, HFOV = 29.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.335 | (ASP) | 0.442 | Plastic | 1.544 | 55.9 | 2.63 |
| 2 | | 17.407 | (ASP) | 0.074 | | | | |
| 3 | Ape. Stop | Plano | | 0.093 | | | | |
| 4 | Lens 2 | 2.376 | (ASP) | 0.220 | Plastic | 1.640 | 23.3 | −3.47 |
| 5 | | 1.107 | (ASP) | 0.113 | | | | |
| 6 | Lens 3 | 3.084 | (ASP) | 0.541 | Plastic | 1.544 | 55.9 | 1.70 |
| 7 | | −1.238 | (ASP) | 0.141 | | | | |
| 8 | Lens 4 | −0.966 | (ASP) | 0.360 | Plastic | 1.640 | 23.3 | −15.15 |
| 9 | | −1.229 | (ASP) | 0.126 | | | | |
| 10 | Lens 5 | 7.272 | (ASP) | 0.551 | Plastic | 1.544 | 55.9 | −2.29 |
| 11 | | 1.037 | (ASP) | 0.300 | | | | |
| 12 | IR-cut filter | Plano | | 0.200 | Glass | 517 | 64.2 | — |
| 13 | | Plano | | 0.239 | | | | |
| 14 | Image | Plano | | — | | | | |

Note:
Reference wavelength (d-line) is 587.6 nm.

TABLE 10

Aspheric Coefficients

| Surface # | 1 | 2 | 4 | 5 | 6 |
|---|---|---|---|---|---|
| k = | 3.7117E−01 | −5.3035E+01 | −8.0205E+01 | −8.1337E+00 | 1.1801E+01 |
| A4 = | −1.2314E−02 | −1.7358E−01 | −2.6986E−01 | −4.1368E−01 | −2.9584E−01 |
| A6 = | 3.6489E−02 | 7.9441E−01 | −1.6659E+00 | 7.2117E−01 | 1.8410E−01 |
| A8 = | 5.4296E−02 | −1.6680E+00 | 1.0381E+01 | −4.2520E−01 | −6.5961E−01 |
| A10 = | −1.2933E−01 | 2.0857E+00 | −1.6659E+01 | 2.5484E+00 | 6.9006E+00 |
| A12 = | 4.9301E−01 | −4.0436E+00 | −7.0086E+01 | −1.6687E+01 | −1.5480E+00 |
| A14 = | −7.1684E−01 | 5.3090E+00 | 1.9360E+02 | 2.8639E+01 | 1.5864E+01 |
| A16 = | | | | | −6.3652E+00 |

| Surface # | 7 | 8 | 9 | 10 | 11 |
|---|---|---|---|---|---|
| k = | 2.6922E−01 | −2.6842E−01 | −7.3260E−01 | −5.3048E+01 | −6.8779E+00 |
| A4 = | −1.1855E−01 | 1.8343E−01 | −3.1414E−01 | −1.4638E+00 | −4.4744E−01 |
| A6 = | −6.0610E−01 | −1.5809E+00 | 9.4158E−01 | 2.1267E+00 | 5.7397E−01 |
| A8 = | 1.0291E+00 | 3.8848E+00 | −1.7772E+00 | −2.6721E+00 | −6.0491E−01 |
| A10 = | −7.7548E−01 | −5.4758E+00 | 2.0374E+00 | 1.6052E+00 | 4.1476E−01 |
| A12 = | 9.0578E−01 | 1.0735E+00 | −1.4172E+00 | −1.1513E+00 | −1.8434E−01 |
| A14 = | −3.0980E−01 | 5.5965E+00 | −9.2227E−01 | 9.2937E−01 | 4.6499E−02 |
| A16 = | | −4.9032E+00 | 1.6034E+00 | −1.7254E+00 | 4.7880E−03 |

In the image capturing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| f (mm) | 2.69 | Td (mm) | 2.661 |
|---|---|---|---|
| Fno | 2.65 | ΣCT/Td | 0.79 |
| HFOV (deg.) | 29.5 | (R5 + R6)/(R5 − R6) | 0.43 |
| V2 + V4 | 46.6 | R10/f | 0.39 |
| CT3/CT1 | 1.224 | f3/f1 | 0.645 |
| T12/T23 | 1.478 | f/f5 | −1.172 |
| (T34 + T45)/CT4 | 0.742 | f5/f4 | 0.152 |

Moreover, In the image capturing lens assembly according to the 5th embodiment, when the focal length of the first lens element 510 is f1, the focal length of the second lens element 520 is f2, the focal length of the third lens element 530 is f3, the focal length of the fourth lens element 540 is f4, and the focal length of the fifth lens element 550 is f5, the following relationship is satisfied:

$|f3/fi| < 0.75$, wherein i=1, 2, 4, 5.

6th Embodiment

Figure 11:
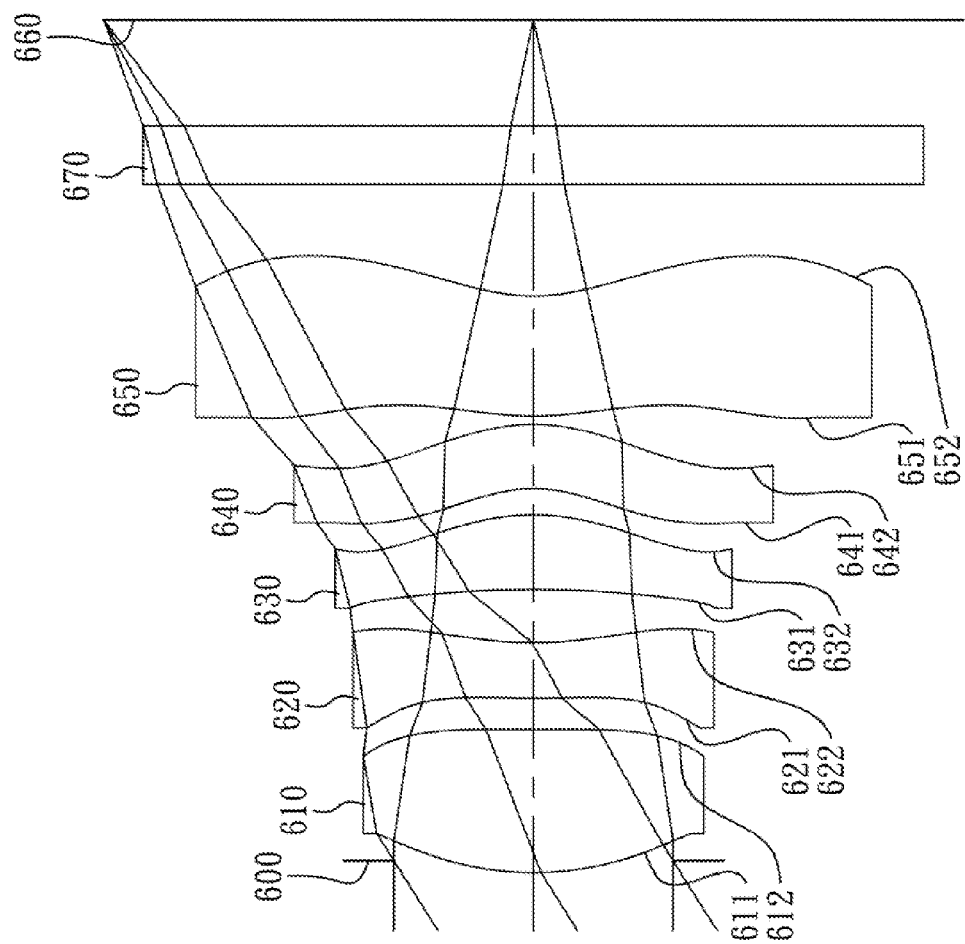
FIG. 11 is a schematic view of an image capturing lens assembly according to the 6th embodiment of the present disclosure.
Figure 12:
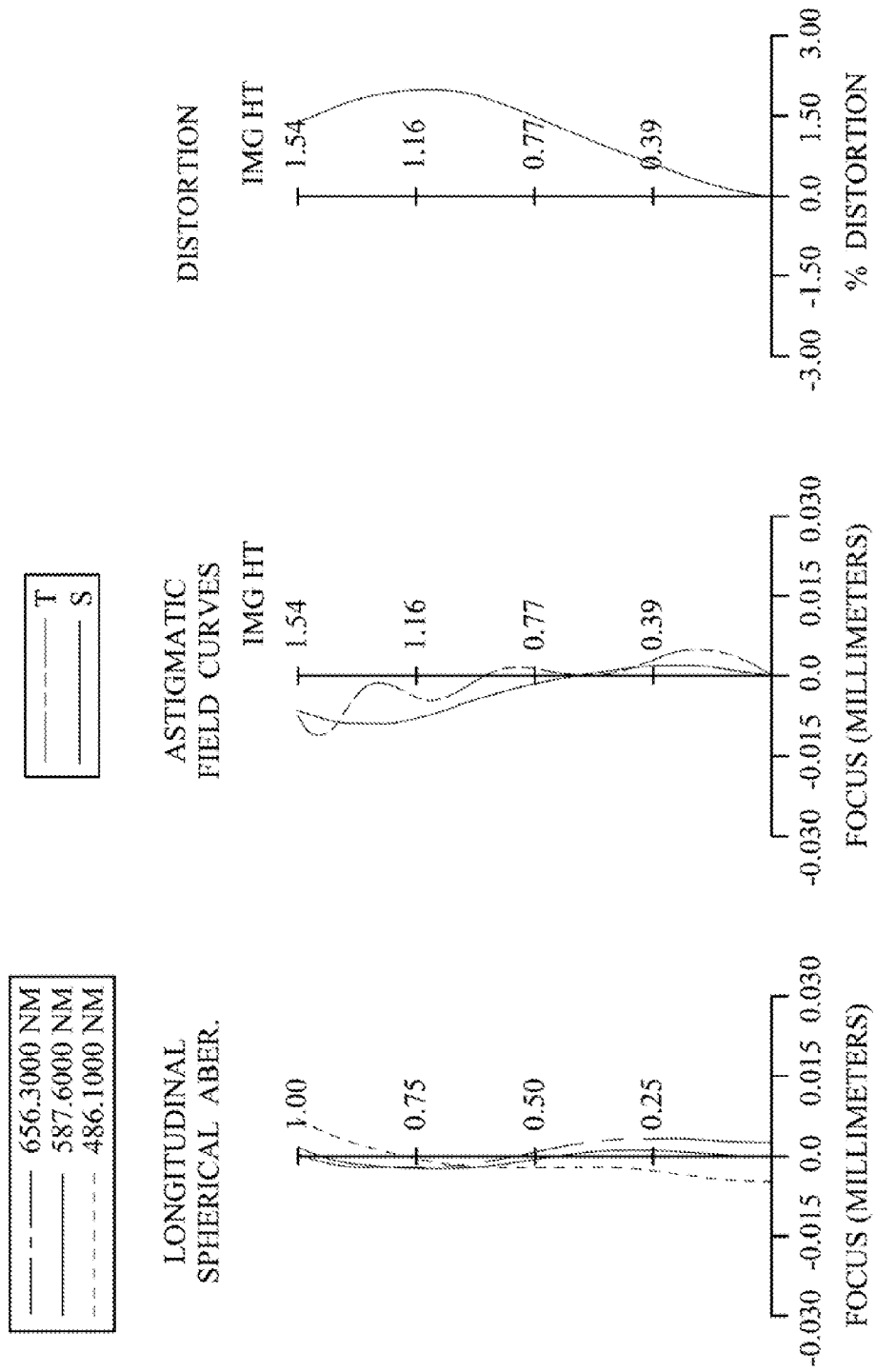
FIG. 12 shows spherical aberration curves, astigmatic field curves and a distortion curve of the image capturing lens assembly according to the 6th embodiment.

FIG. 11 is a schematic view of an image capturing lens assembly according to the 6th embodiment of the present disclosure. FIG. 12 shows spherical aberration curves, astigmatic field curves and a distortion curve of the image capturing lens assembly according to the 6th embodiment. In FIG. 11, the image capturing lens assembly includes, in order from an object side to an image side, an aperture stop 600, a first lens element 610, a second lens element 620, a third lens element 630, a fourth lens element 640, a fifth lens element 650, an IR-cut filter 670 and an image plane 660.

The first lens element 610 with positive refractive power has an object-side surface 611 being convex at a paraxial region thereof and an image-side surface 612 being concave at a paraxial region thereof. The first lens element 610 is made of plastic material, and has the object-side surface 611 and the image-side surface 612 both being aspheric.

The second lens element 620 with negative refractive power has an object-side surface 621 being convex at a paraxial region thereof, and has an image-side surface 622 being concave at a paraxial region thereof and being convex at a peripheral region thereof. The second lens element 620 is made of plastic material, and has the object-side surface 621 and the image-side surface 622 both being aspheric.

The third lens element 630 with positive refractive power has an object-side surface 631 being concave at a paraxial region thereof and an image-side surface 632 being convex at a paraxial region thereof. The third lens element 630 is made of plastic material, and has the object-side surface 631 and the image-side surface 632 both being aspheric.

The fourth lens element 640 with negative refractive power has an object-side surface 641 being concave at a paraxial region thereof and an image-side surface 642 being convex at a paraxial region thereof. The fourth lens element 640 is made of plastic material, and has the object-side surface 641 and the image-side surface 642 both being aspheric.

The fifth lens element 650 with negative refractive power has an object-side surface 651 being convex at a paraxial region thereof, and has an image-side surface 652 being concave at a paraxial region thereof and being convex at a peripheral region thereof. The fifth lens element 650 is made of plastic material, and has the object-side surface 651 and the image-side surface 652 both being aspheric.

The IR-cut filter 670 is made of glass material which located between the fifth lens element 650 and the image plane 660, and will not affect the focal length of the image capturing lens assembly.

The detailed optical data of the 6th embodiment are shown in Table 11 and the aspheric surface data are shown in Table 12 below.

TABLE 11

6th Embodiment
f = 2.40 mm, Fno = 2.40, HFOV = 32.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.043 | | | | |
| 2 | Lens 1 | 1.117 | (ASP) | 0.516 | Plastic | 1.535 | 55.7 | 2.11 |
| 3 | | 105.583 | (ASP) | 0.111 | | | | |
| 4 | Lens 2 | 4.851 | (ASP) | 0.200 | Plastic | 1.634 | 23.8 | −3.22 |
| 5 | | 1.414 | (ASP) | 0.190 | | | | |
| 6 | Lens 3 | −4.164 | (ASP) | 0.269 | Plastic | 1.535 | 55.7 | 1.72 |
| 7 | | −0.771 | (ASP) | 0.094 | | | | |
| 8 | Lens 4 | −0.488 | (ASP) | 0.230 | Plastic | 1.634 | 23.8 | −6.75 |
| 9 | | −0.651 | (ASP) | 0.030 | | | | |
| 10 | Lens 5 | 1.115 | (ASP) | 0.431 | Plastic | 1.535 | 55.7 | −4.62 |
| 11 | | 0.665 | (ASP) | 0.406 | | | | |
| 12 | IR-cut filter | Plano | | 0.210 | Glass | 1.517 | 64.2 | — |
| 13 | | Plano | | 0.386 | | | | |
| 14 | Image | Plano | | — | | | | |

Note:
Reference wavelength (d-line) is 587.6 nm.

TABLE 12

Aspheric Coefficients

| Surface # | 2 | 3 | 4 | 5 | 6 |
|---|---|---|---|---|---|
| k = | 1.7054E−01 | 5.0000E+01 | −2.2068E+01 | −6.9482E+00 | −1.8885E+01 |
| A4 = | −4.8380E−02 | −4.8943E−01 | −1.1033E+00 | −3.1171E−01 | −1.6223E−02 |
| A6 = | 1.4494E−01 | −5.0622E−01 | −8.5134E−01 | −5.4968E−01 | −1.0249E+00 |
| A8 = | −2.2044E+00 | −6.8739E−01 | 5.1565E−01 | −3.5896E−01 | 6.2046E+00 |
| A10 = | 6.2801E+00 | 1.0068E+00 | −6.8162E−01 | 8.6168E+00 | −7.1275E+00 |
| A12 = | −8.8733E+00 | 2.6806E+00 | 3.0547E+01 | −3.1964E+01 | −1.9058E+01 |
| A14 = | −7.8310E+00 | −6.1756E+00 | −3.8423E+01 | 3.7944E+01 | 3.6872E+01 |
| A16 = | | | | | −1.8482E+01 |

| Surface # | 7 | 8 | 9 | 10 | 11 |
|---|---|---|---|---|---|
| k = | −4.2636E+00 | −4.3834E+00 | −4.6331E+00 | −7.1310E+00 | −5.2730E+00 |
| A4 = | 1.4572E−01 | 9.1175E−01 | −1.1822E+00 | −1.4359E+00 | −6.3299E−01 |
| A6 = | −4.6240E−01 | −9.7392E−01 | 2.1791E+00 | 3.8704E+00 | 1.2363E+00 |
| A8 = | 3.5115E+00 | 3.9499E+00 | −5.3415E+00 | −7.8978E+00 | −1.9680E+00 |
| A10 = | −4.4962E+00 | −1.7933E+01 | 8.6308E+00 | 1.0973E+01 | 2.0604E+00 |
| A12 = | 5.2491E+00 | 3.8160E+01 | −8.5135E+00 | −8.9475E+00 | −1.3329E+00 |
| A14 = | −5.5174E+00 | −3.9044E+01 | 3.7306E+00 | 3.8502E+00 | 4.7719E−01 |
| A16 = | | 1.5195E+01 | −3.3764E−01 | −6.7876E−01 | −7.1456E−02 |

In the image capturing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 2.40 | Td (mm) | 2.071 |
| Fno | 2.40 | ΣCT/Td | 0.79 |
| HFOV (deg.) | 32.3 | (R5 + R6)/(R5 − R6) | 1.45 |
| V2 + V4 | 47.6 | R10/f | 0.28 |
| CT3/CT1 | 0.521 | f3/f1 | 0.817 |
| T12/T23 | 0.584 | f/f5 | −0.520 |
| (T34 + T45)/CT4 | 4.539 | f5/f4 | 0.685 |

Moreover, In the image capturing lens assembly according to the 6th embodiment, when the focal length of the second lens element 620 is f2, the focal length of the third lens element 630 is f3, the focal length of the fourth lens element 640 is f4, and the focal length of the fifth lens element 650 is f5, the following relationship is satisfied:

$$|f3/fi|<0.75,$$

wherein i=2, 4, 5.

7th Embodiment

Figure 13:
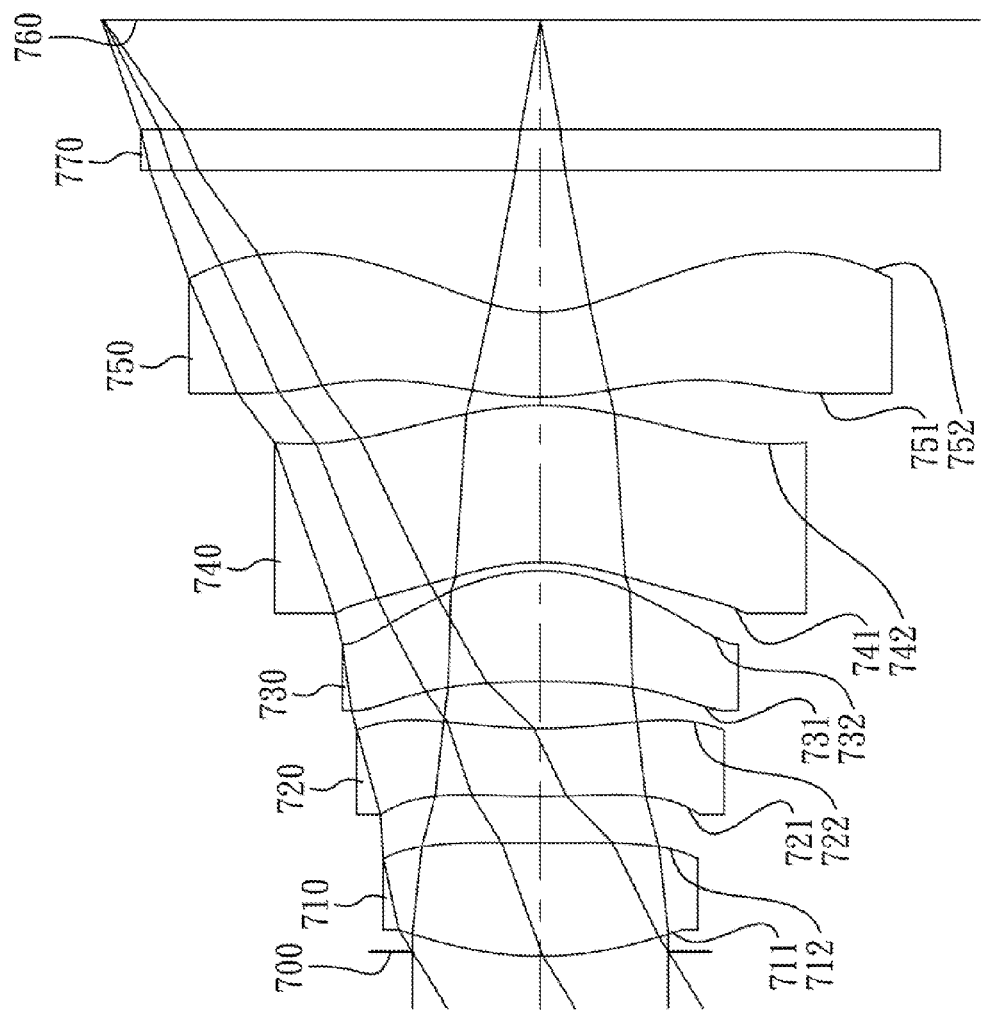
FIG. 13 is a schematic view of an image capturing lens assembly according to the 7th embodiment of the present disclosure.
Figure 14:
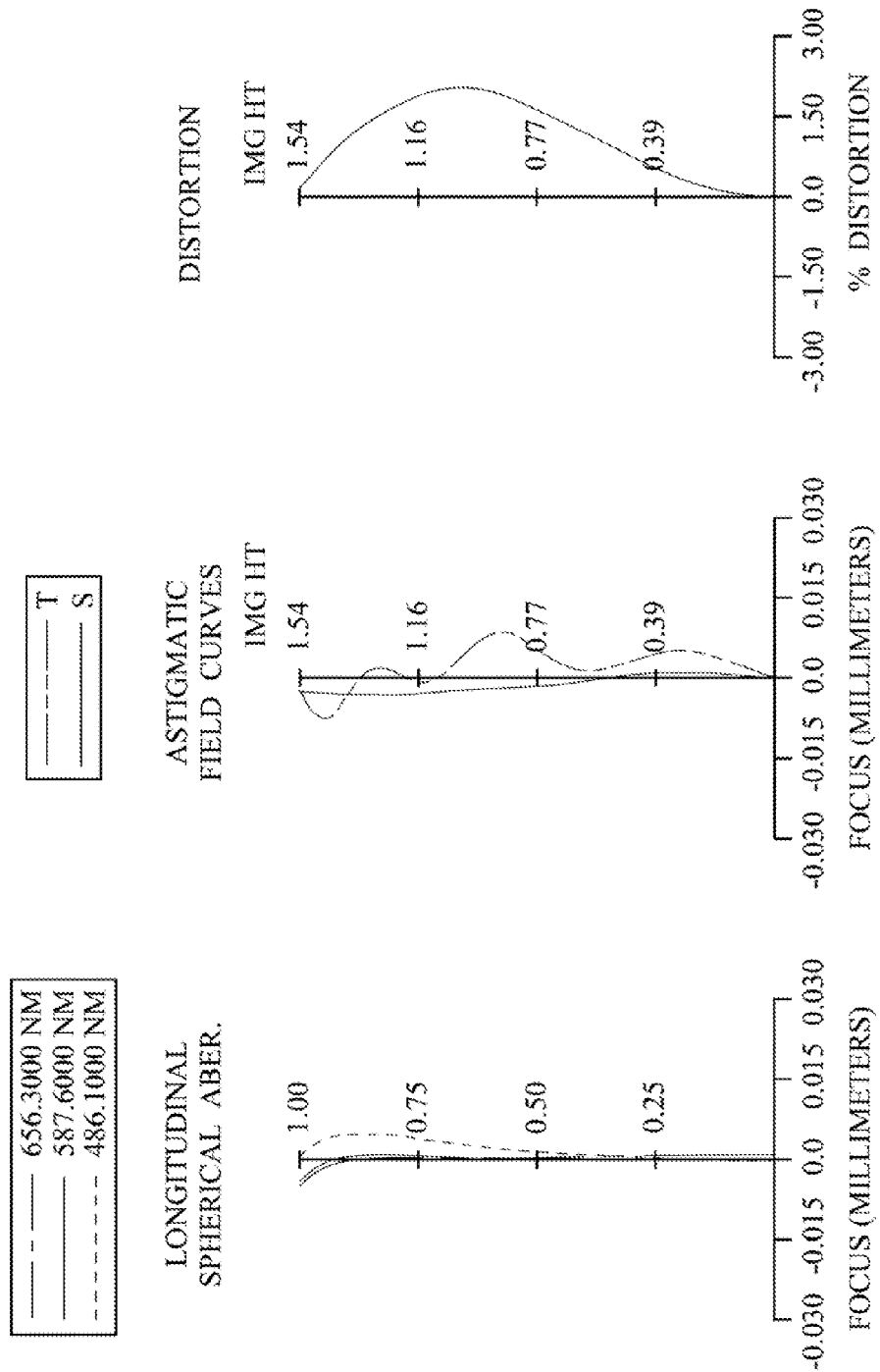
FIG. 14 shows spherical aberration curves, astigmatic field curves and a distortion curve of the image capturing lens assembly according to the 7th embodiment.

FIG. 13 is a schematic view of an image capturing lens assembly according to the 7th embodiment of the present disclosure. FIG. 14 shows spherical aberration curves, astigmatic field curves and a distortion curve of the image capturing lens assembly according to the 7th embodiment. In FIG. 13, the image capturing lens assembly includes, in order from an object side to an image side, an aperture stop 700, a first lens element 710, a second lens element 720, a third lens element 730, a fourth lens element 740, a fifth lens element 750, an IR-cut filter 770 and an image plane 760.

The first lens element 710 with positive refractive power has an object-side surface 711 being convex at a paraxial region thereof and an image-side surface 712 being concave at a paraxial region thereof. The first lens element 710 is made of plastic material, and has the object-side surface 711 and the image-side surface 712 both being aspheric.

The second lens element 720 with negative refractive power has an object-side surface 721 being convex at a paraxial region thereof, and has an image-side surface 722 being concave at a paraxial region thereof and being convex at a peripheral region thereof. The second lens element 720 is made of plastic material, and has the object-side surface 721 and the image-side surface 722 both being aspheric.

The third lens element 730 with positive refractive power has an object-side surface 731 being concave at a paraxial region thereof and an image-side surface 732 being convex at a paraxial region thereof. The third lens element 730 is made of plastic material, and has the object-side surface 731 and the image-side surface 732 both being aspheric.

The fourth lens element 740 with negative refractive power has an object-side surface 741 being concave at a paraxial region thereof and an image-side surface 742 being convex at a paraxial region thereof. The fourth lens element 740 is made of plastic material, and has the object-side surface 741 and the image-side surface 742 both being aspheric.

The fifth lens element 750 with negative refractive power has an object-side surface 751 being convex at a paraxial region thereof, and has an image-side surface 752 being concave at a paraxial region thereof and being convex at a peripheral region thereof. The fifth lens element 750 is made of plastic material, and has the object-side surface 751 and the image-side surface 752 both being aspheric.

The IR-cut filter 770 is made of glass material which located between the fifth lens element 750 and the image plane 760, and will not affect the focal length of the image capturing lens assembly.

The detailed optical data of the 7th embodiment are shown in Table 13 and the aspheric surface data are shown in Table 14 below.

TABLE 13

7th Embodiment
f = 2.51 mm, Fno = 2.78, HFOV = 31.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.014 | | | | |
| 2 | Lens 1 | 1.265 | (ASP) | 0.399 | Plastic | 1.535 | 55.7 | 2.42 |
| 3 | | 45.770 | (ASP) | 0.165 | | | | |
| 4 | Lens 2 | 4.263 | (ASP) | 0.240 | Plastic | 1.640 | 23.3 | −5.63 |
| 5 | | 1.910 | (ASP) | 0.163 | | | | |
| 6 | Lens 3 | −3.485 | (ASP) | 0.391 | Plastic | 1.544 | 55.9 | 1.35 |
| 7 | | −0.632 | (ASP) | 0.030 | | | | |
| 8 | Lens 4 | −0.727 | (ASP) | 0.555 | Plastic | 1.640 | 23.3 | −10.04 |
| 9 | | −1.064 | (ASP) | 0.030 | | | | |
| 10 | Lens 5 | 1.000 | (ASP) | 0.300 | Plastic | 1.535 | 55.7 | −2.32 |
| 11 | | 0.496 | (ASP) | 0.500 | | | | |
| 12 | IR-cut filter | Plano | | 0.145 | Glass | 1.517 | 64.2 | — |
| 13 | | Plano | | 0.385 | | | | |
| 14 | Image | Plano | | — | | | | |

Note:
Reference wavelength (d-line) is 587.6 nm.

TABLE 14

Aspheric Coefficients

| Surface # | 2 | 3 | 4 | 5 | 6 |
|---|---|---|---|---|---|
| k = | −5.3819E−01 | 5.0000E+01 | 4.7203E+01 | −1.5981E+00 | 1.7067E+01 |
| A4 = | −2.9203E−02 | −3.9458E−01 | −7.8582E−01 | −4.2997E−01 | −3.5726E−01 |
| A6 = | −8.1592E−02 | −5.1900E−01 | −1.2756E+00 | −9.4795E−01 | −9.9407E−01 |
| A8 = | −1.2772E+00 | −8.3925E−01 | 5.8884E−01 | 2.2248E−01 | 4.9002E+00 |
| A10 = | 2.2724E+00 | 4.3663E−01 | 2.5308E+00 | 8.8241E+00 | −4.0353E+00 |
| A12 = | −7.8122E+00 | −5.2613E+00 | −2.7473E+01 | −3.3066E+01 | −9.9200E+00 |
| A14 = | −8.4562E−01 | 9.7616E+00 | 4.6743E+01 | 3.9771E+01 | 4.6887E+01 |
| A16 = | | | | | −4.4431E+01 |

| Surface # | 7 | 8 | 9 | 10 | 11 |
|---|---|---|---|---|---|
| k = | −2.8111E+00 | −4.4204E+00 | −9.3323E+00 | −1.5003E+00 | −3.6872E+00 |
| A4 = | −5.3790E−02 | 5.8416E−01 | −1.9105E−01 | −1.6163E+00 | −6.7761E−01 |
| A6 = | −7.1375E−01 | −1.0928E+00 | 1.7481E+00 | 3.8352E+00 | 1.2656E+00 |
| A8 = | 3.2573E+00 | 4.3839E+00 | −5.2461E+00 | −7.8788E+00 | −1.9819E+00 |
| A10 = | −5.6468E+00 | −1.8037E+01 | 8.9466E+00 | 1.0994E+01 | 2.0684E+00 |
| A12 = | 4.0775E+00 | 3.7029E+01 | −8.2422E+00 | −8.9358E+00 | −1.3291E+00 |
| A14 = | 4.5775E+00 | −3.9769E+01 | 3.7621E+00 | 3.6567E+00 | 4.7313E−01 |
| A16 = | | 1.7195E+01 | −6.6463E−01 | −6.9162E−01 | −7.1223E−02 |

In the image capturing lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| f (mm) | 2.51 | Td (mm) | 2.273 |
|---|---|---|---|
| Fno | 2.78 | ΣCT/Td | 0.83 |
| HFOV (deg.) | 31.5 | (R5 + R6)/(R5 − R6) | 1.44 |
| V2 + V4 | 46.6 | R10/f | 0.20 |
| CT3/CT1 | 0.980 | f3/f1 | 0.558 |
| T12/T23 | 1.012 | f/f5 | −1.082 |
| (T34 + T45)/CT4 | 0.108 | f5/f4 | 0.231 |

Moreover, In the image capturing lens assembly according to the 7th embodiment, when the focal length of the first lens element 710 is f1, the focal length of the second lens element 720 is f2, the focal length of the third lens element 730 is f3, the focal length of the fourth lens element 740 is f4, and the focal length of the fifth lens element 750 is f5, the following relationship is satisfied:

$$|f3/fi| < 0.75,$$

wherein i=1, 2, 4, 5.

8th Embodiment

Figure 15:
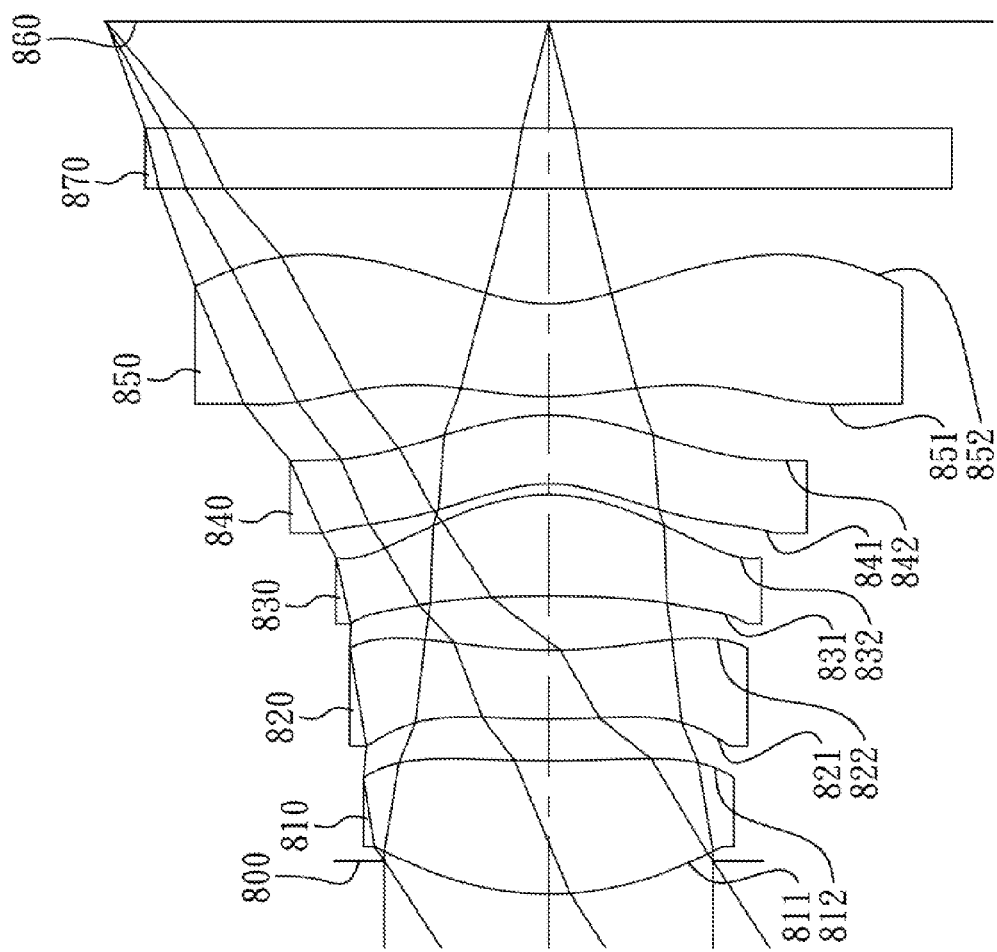
FIG. 15 is a schematic view of an image capturing lens assembly according to the 8th embodiment of the present disclosure.
Figure 16:
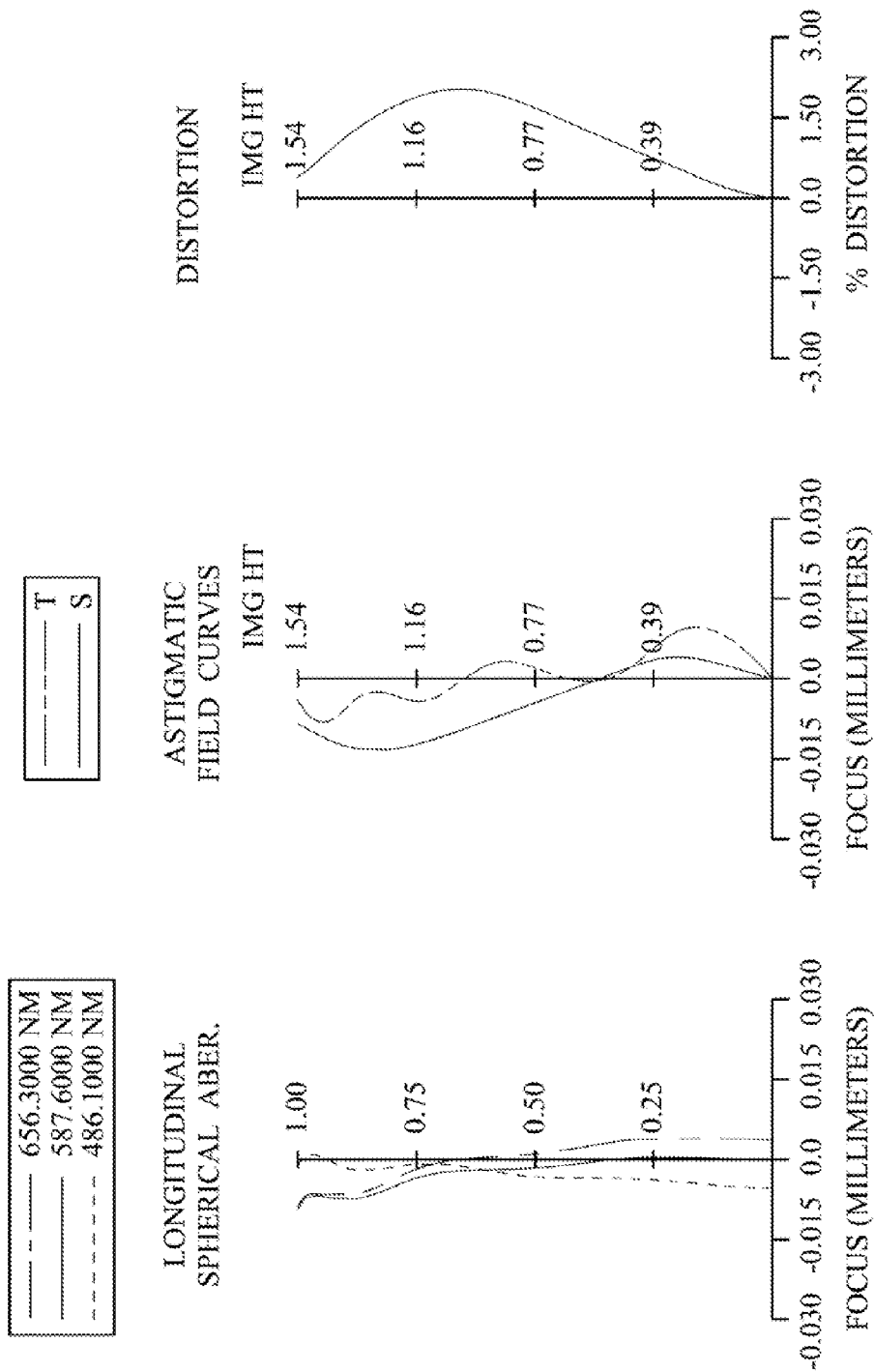
FIG. 16 shows spherical aberration curves, astigmatic field curves and a distortion curve of the image capturing lens assembly according to the 8th embodiment.

FIG. 15 is a schematic view of an image capturing lens assembly according to the 8th embodiment of the present disclosure. FIG. 16 shows spherical aberration curves, astigmatic field curves and a distortion curve of the image capturing lens assembly according to the 8th embodiment. In FIG. 15, the image capturing lens assembly includes, in order from an object side to an image side, an aperture stop 800, a first lens element 810, a second lens element 820, a third lens element 830, a fourth lens element 840, a fifth lens element 850, an IR-cut filter 870 and an image plane 860.

The first lens element 810 with positive refractive power has an object-side surface 811 being convex at a paraxial region thereof and an image-side surface 812 being concave at a paraxial region thereof. The first lens element 810 is made of plastic material, and has the object-side surface 811 and the image-side surface 812 both being aspheric.

The second lens element 820 with negative refractive power has an object-side surface 821 being convex at a paraxial region thereof, and has an image-side surface 822 being concave at a paraxial region thereof and being convex at a peripheral region thereof. The second lens element 820 is made of plastic material, and has the object-side surface 821 and the image-side surface 822 both being aspheric.

The third lens element 830 with positive refractive power has an object-side surface 831 being concave at a paraxial region thereof and an image-side surface 832 being convex at a paraxial region thereof. The third lens element 830 is made of plastic material, and has the object-side surface 831 and the image-side surface 832 both being aspheric.

The fourth lens element 840 with negative refractive power has an object-side surface 841 being concave at a paraxial region thereof and an image-side surface 842 being convex at a paraxial region thereof. The fourth lens element 840 is made of plastic material, and has the object-side surface 841 and the image-side surface 842 both being aspheric.

The fifth lens element 850 with negative refractive power has an object-side surface 851 being convex at a paraxial region thereof, and has an image-side surface 852 being concave at a paraxial region thereof and being convex at a peripheral region thereof. The fifth lens element 850 is made of plastic material, and has the object-side surface 851 and the image-side surface 852 both being aspheric.

The IR-cut filter 870 is made of glass material which located between the fifth lens element 850 and the image plane 860, and will not affect the focal length of the image capturing lens assembly.

The detailed optical data of the 8th embodiment are shown in Table 15 and the aspheric surface data are shown in Table 16 below.

TABLE 15

8th Embodiment
f = 2.34 mm, Fno = 2.05, HFOV = 33.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.115 | | | | |
| 2 | Lens 1 | 1.105 | (ASP) | 0.465 | Plastic | 1.535 | 55.7 | 2.59 |
| 3 | | 4.620 | (ASP) | 0.144 | | | | |
| 4 | Lens 2 | 3.359 | (ASP) | 0.240 | Plastic | 1.650 | 21.4 | −5.77 |
| 5 | | 1.721 | (ASP) | 0.187 | | | | |
| 6 | Lens 3 | −4.767 | (ASP) | 0.354 | Plastic | 1.530 | 55.8 | 1.31 |
| 7 | | −0.623 | (ASP) | 0.036 | | | | |
| 8 | Lens 4 | −0.543 | (ASP) | 0.240 | Plastic | 1.633 | 23.4 | −5.72 |
| 9 | | −0.748 | (ASP) | 0.065 | | | | |
| 10 | Lens 5 | 1.085 | (ASP) | 0.323 | Plastic | 1.535 | 55.7 | −2.66 |
| 11 | | 0.551 | (ASP) | 0.400 | | | | |
| 12 | IR-cut filter | Plano | | 0.210 | Glass | 1.517 | 64.2 | — |
| 13 | | Plano | | 0.371 | | | | |
| 14 | Image | Plano | | — | | | | |

Note:
Reference wavelength (d-line) is 587.6 nm.

TABLE 16

| Aspheric Coefficients | | | | | |
|---|---|---|---|---|---|
| Surface # | 2 | 3 | 4 | 5 | 6 |
| k = | 1.7076E−03 | 4.5998E+01 | 2.3444E+01 | −1.6738E+01 | 1.0598E+01 |
| A4 = | −3.7700E−02 | −4.4241E−01 | −8.9446E−01 | −9.2469E−02 | −1.7665E−01 |
| A6 = | 2.4933E−01 | −2.5256E−01 | −8.9991E−01 | −8.0607E−01 | −1.1360E+00 |
| A8 = | −2.3236E+00 | −7.6770E−01 | 1.5785E+00 | −6.7346E−01 | 6.5997E+00 |
| A10 = | 7.4966E+00 | −2.1088E+00 | −7.2831E+00 | 1.2084E+01 | −6.3532E+00 |
| A12 = | −1.2234E+01 | 6.0719E+00 | 1.4097E+01 | −3.4497E+01 | −1.6981E+01 |
| A14 = | 1.3104E+00 | −8.1030E+00 | −2.0458E+00 | 2.9011E+01 | 4.2728E+01 |
| A16 = | | | | | −3.9318E+01 |
| Surface # | 7 | 8 | 9 | 10 | 11 |
| k = | −3.0871E+00 | −4.4191E+00 | −6.8985E+00 | −5.0609E+00 | −4.5964E+00 |
| A4 = | 1.5420E−01 | 7.6186E−01 | −1.9162E−01 | −1.5389E+00 | −6.7458E−01 |
| A6 = | −8.8788E−01 | −1.0433E+00 | 1.9467E+00 | 3.9020E+00 | 1.2759E+00 |
| A8 = | 3.1420E+00 | 4.1134E+00 | −5.2780E+00 | −7.8833E+00 | −1.9820E+00 |
| A10 = | −4.4980E+00 | −1.7877E+01 | 8.8275E+00 | 1.0980E+01 | 2.0565E+00 |
| A12 = | 6.2522E+00 | 3.7745E+01 | −8.3709E+00 | −8.9532E+00 | −1.3293E+00 |
| A14 = | −3.6792E+00 | −3.9524E+01 | 3.7281E+00 | 3.8480E+00 | 4.7884E−01 |
| A16 = | | 1.6446E+01 | −5.3551E−01 | −6.7840E−01 | −7.2562E−02 |

In the image capturing lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 2.34 | Td (mm) | 2.054 |
| Fno | 2.05 | ΣCT/Td | 0.79 |
| HFOV (deg.) | 33.3 | (R5 + R6)/(R5 − R6) | 1.30 |
| V2 + V4 | 44.8 | R10/f | 0.24 |
| CT3/CT1 | 0.761 | f3/f1 | 0.507 |
| T12/T23 | 0.770 | f/f5 | −0.880 |
| (T34 + T45)/CT4 | 0.421 | f5/f4 | 0.465 |

Moreover, In the image capturing lens assembly according to the 8th embodiment, when the focal length of the first lens element 810 is f1, the focal length of the second lens element 820 is f2, the focal length of the third lens element 830 is f3, the focal length of the fourth lens element 840 is f4, and the focal length of the fifth lens element 850 is f5, the following relationship is satisfied:

$|f3/fi|<0.75$, wherein i=1, 2, 4, 5.

9th Embodiment

Figure 17:
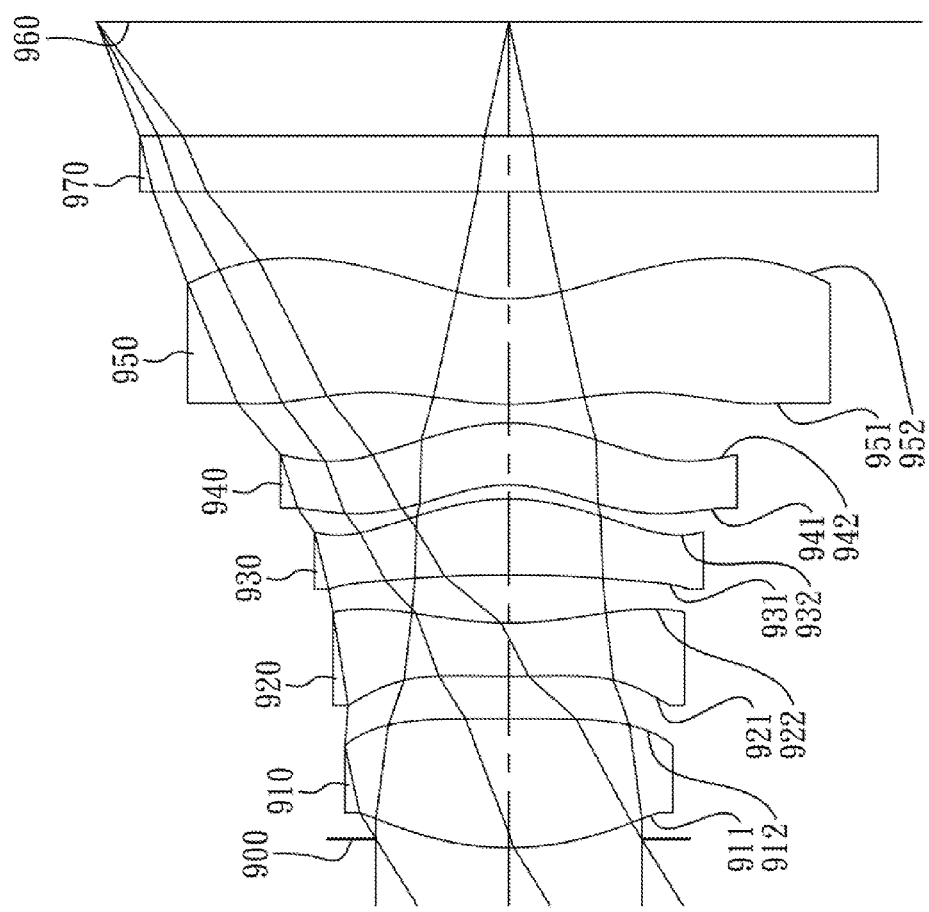
FIG. 17 is a schematic view of an image capturing lens assembly according to the 9th embodiment of the present disclosure.
Figure 18:
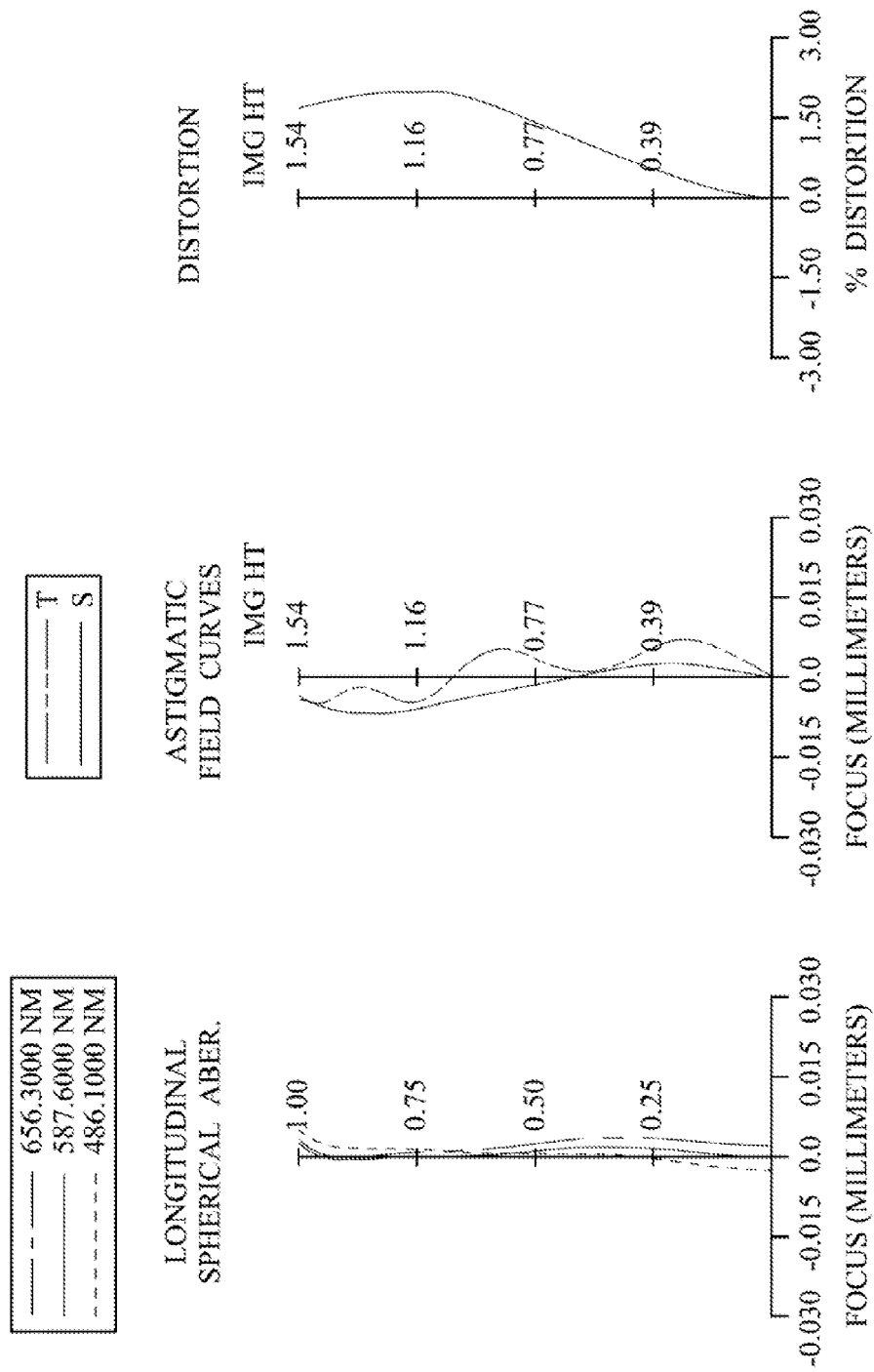
FIG. 18 shows spherical aberration curves, astigmatic field curves and a distortion curve of the image capturing lens assembly according to the 9th embodiment.

FIG. 17 is a schematic view of an image capturing lens assembly according to the 9th embodiment of the present disclosure. FIG. 18 shows spherical aberration curves, astigmatic field curves and a distortion curve of the image capturing lens assembly according to the 9th embodiment. In FIG. 17, the image capturing lens assembly includes, in order from an object side to an image side, an aperture stop 900, a first lens element 910, a second lens element 920, a third lens element 930, a fourth lens element 940, a fifth lens element 950, an IR-cut filter 970 and an image plane 960.

The first lens element 910 with positive refractive power has an object-side surface 911 being convex at a paraxial region thereof and an image-side surface 912 being convex at a paraxial region thereof. The first lens element 910 is made of plastic material, and has the object-side surface 911 and the image-side surface 912 both being aspheric.

The second lens element 920 with negative refractive power has an object-side surface 921 being convex at a paraxial region thereof, and has an image-side surface 922 being concave at a paraxial region thereof and being convex at a peripheral region thereof. The second lens element 920 is made of plastic material, and has the object-side surface 921 and the image-side surface 922 both being aspheric.

The third lens element 930 with positive refractive power has an object-side surface 931 being concave at a paraxial region thereof and an image-side surface 932 being convex at a paraxial region thereof. The third lens element 930 is made of plastic material, and has the object-side surface 931 and the image-side surface 932 both being aspheric.

The fourth lens element 940 with negative refractive power has an object-side surface 941 being concave at a paraxial region thereof and an image-side surface 942 being convex at a paraxial region thereof. The fourth lens element 940 is made of plastic material, and has the object-side surface 941 and the image-side surface 942 both being aspheric.

The fifth lens element 950 with negative refractive power has an object-side surface 951 being convex at a paraxial region thereof, and has an image-side surface 952 being concave at a paraxial region thereof and being convex at a peripheral region thereof. The fifth lens element 950 is made of plastic material, and has the object-side surface 951 and the image-side surface 952 both being aspheric.

The IR-cut filter 970 is made of glass material which located between the fifth lens element 950 and the image plane 960, and will not affect the focal length of the image capturing lens assembly.

The detailed optical data of the 9th embodiment are shown in Table 17 and the aspheric surface data are shown in Table 18 below.

TABLE 17

9th Embodiment
f = 2.43 mm, Fno = 2.45, HFOV = 31.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.031 | | | | |
| 2 | Lens 1 | 1.143 | (ASP) | 0.483 | Plastic | 1.530 | 55.8 | 2.13 |
| 3 | | −83.702 | (ASP) | 0.158 | | | | |
| 4 | Lens 2 | 5.360 | (ASP) | 0.200 | Plastic | 1.634 | 23.8 | −2.99 |
| 5 | | 1.361 | (ASP) | 0.179 | | | | |
| 6 | Lens 3 | −5.695 | (ASP) | 0.285 | Plastic | 1.535 | 55.7 | 1.62 |
| 7 | | −0.765 | (ASP) | 0.052 | | | | |
| 8 | Lens 4 | −0.533 | (ASP) | 0.230 | Plastic | 1.640 | 23.3 | −7.40 |
| 9 | | −0.702 | (ASP) | 0.072 | | | | |
| 10 | Lens 5 | 1.089 | (ASP) | 0.394 | Plastic | 1.535 | 55.7 | −4.05 |
| 11 | | 0.633 | (ASP) | 0.400 | | | | |
| 12 | IR-cut filter | Plano | | 0.210 | Glass | 1.517 | 64.2 | — |
| 13 | | Plano | | 0.426 | | | | |
| 14 | Image | Plano | | — | | | | |

Note:
Reference wavelength (d-line) is 587.6 nm.

TABLE 18

Aspheric Coefficients

| Surface # | 2 | 3 | 4 | 5 | 6 |
|---|---|---|---|---|---|
| k = | 4.7790E−02 | −4.7861E+01 | −2.0213E+01 | −8.1140E+00 | −1.7858E+01 |
| A4 = | −5.8626E−02 | −4.4776E−01 | −1.1122E+00 | −2.8155E−01 | −6.3254E−02 |
| A6 = | 9.5188E−02 | −4.2860E−01 | −7.6726E−01 | −5.1066E−01 | −7.5492E−01 |
| A8 = | −2.2857E+00 | −9.9513E−01 | 3.4339E−01 | −5.0118E−01 | 6.1893E+00 |
| A10 = | 5.6861E+00 | 1.2528E+00 | −7.9278E−01 | 8.7144E+00 | −7.3708E+00 |
| A12 = | −5.5951E+00 | 2.3033E+00 | 3.3487E+01 | −3.0791E+01 | −1.9330E+01 |
| A14 = | −1.7096E+01 | −7.9970E+00 | −4.3278E+01 | 3.5807E+01 | 3.8930E+01 |
| A16 = |  |  |  |  | −1.4164E+01 |

| Surface # | 7 | 8 | 9 | 10 | 11 |
|---|---|---|---|---|---|
| k = | −4.7838E+00 | −4.6041E+00 | −5.1385E+00 | −5.6015E+00 | −4.9692E+00 |
| A4 = | 1.2780E−01 | 9.7020E−01 | −1.4300E−01 | −1.4466E−01 | −6.4261E−01 |
| A6 = | −4.8521E−01 | −9.6164E−01 | 2.2579E+00 | 3.8580E+00 | 1.2432E+00 |
| A8 = | 3.4123E+00 | 3.8246E+00 | −5.3171E+00 | −7.9000E+00 | −1.9720E+00 |
| A10 = | −4.6720E+00 | −1.7956E+01 | 8.5907E+00 | 1.0979E+01 | 2.0619E+00 |
| A12 = | 5.2267E+00 | 3.8395E+01 | −8.5560E+00 | −8.9441E+00 | −1.3313E+00 |
| A14 = | −4.6879E+00 | −3.8659E+01 | 3.7239E+00 | 3.8509E+00 | 4.7695E−01 |
| A16 = |  | 1.4731E+01 | −3.0358E−01 | −6.8101E−01 | −7.1843E−02 |

In the image capturing lens assembly according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| f (mm) | 2.43 | Td (mm) | 2.053 |
|---|---|---|---|
| Fno | 2.45 | ΣCT/Td | 0.78 |
| HFOV (deg.) | 31.9 | (R5 + R6)/(R5 − R6) | 1.31 |
| V2 + V4 | 47.1 | R10/f | 0.26 |
| CT3/CT1 | 0.590 | f3/f1 | 0.760 |
| T12/T23 | 0.883 | f/f5 | −0.601 |
| (T34 + T45)/CT4 | 0.539 | f5/f4 | 0.547 |

Moreover, In the image capturing lens assembly according to the 9th embodiment, when the focal length of the second lens element 920 is f2, the focal length of the third lens element 930 is f3, the focal length of the fourth lens element 940 is f4, and the focal length of the fifth lens element 950 is f5, the following relationship is satisfied:

$|f3/fi| < 0.75,$ wherein i=2, 4, 5.

10th Embodiment

Figure 19:
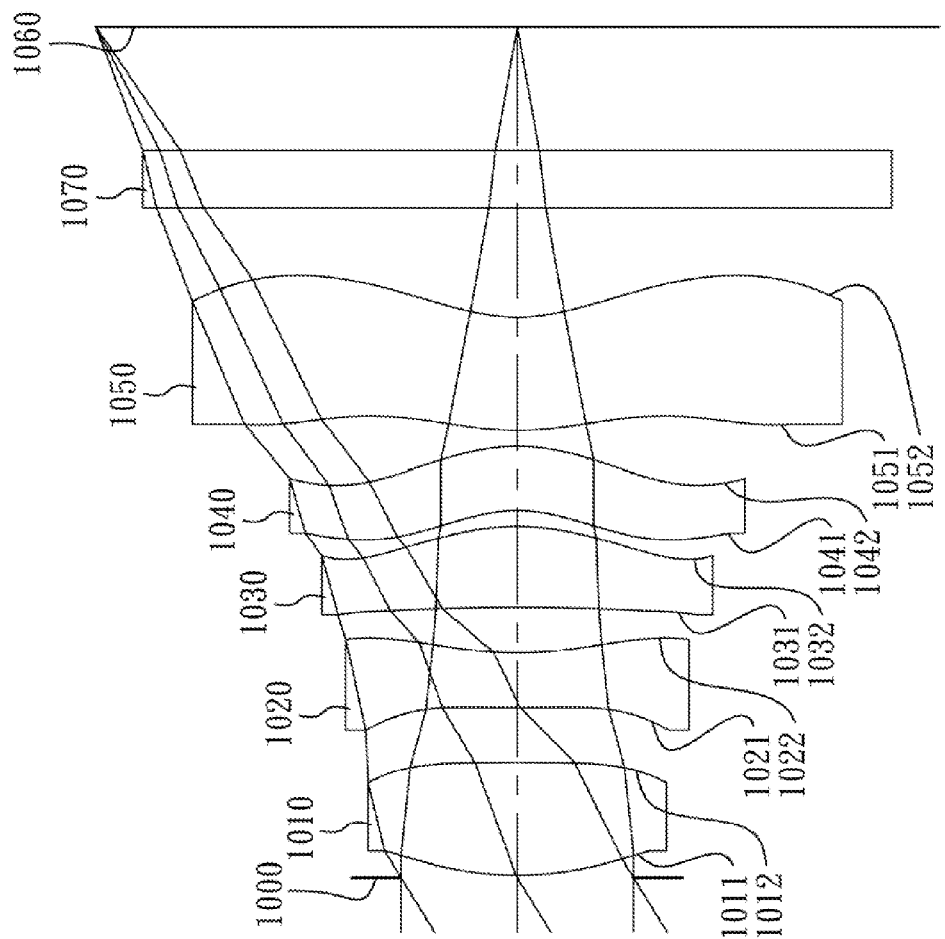
FIG. 19 is a schematic view of an image capturing lens assembly according to the 10th embodiment of the present disclosure.
Figure 20:
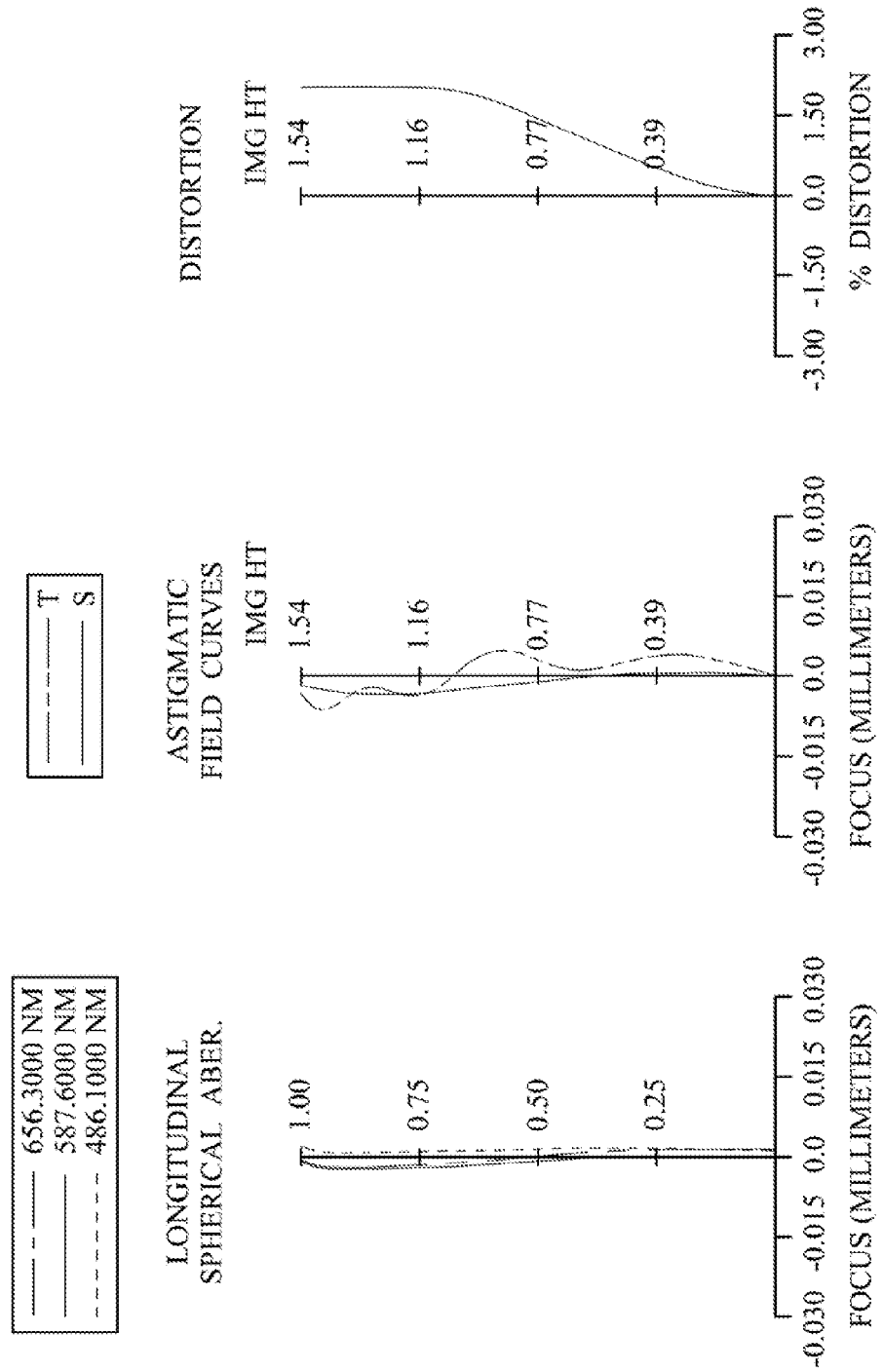
FIG. 20 shows spherical aberration curves, astigmatic field curves and a distortion curve of the image capturing lens assembly according to the 10th embodiment.

FIG. 19 is a schematic view of an image capturing lens assembly according to the 10th embodiment of the present disclosure. FIG. 20 shows spherical aberration curves, astigmatic field curves and a distortion curve of the image capturing lens assembly according to the 10th embodiment. In FIG. 19, the image capturing lens assembly includes, in order from an object side to an image side, an aperture stop 1000, a first lens element 1010, a second lens element 1020, a third lens element 1030, a fourth lens element 1040, a fifth lens element 1050, an IR-cut filter 1070 and an image plane 1060.

The first lens element 1010 with positive refractive power has an object-side surface 1011 being convex at a paraxial region thereof and an image-side surface 1012 being convex at a paraxial region thereof. The first lens element 1010 is made of plastic material, and has the object-side surface 1011 and the image-side surface 1012 both being aspheric.

The second lens element 1020 with negative refractive power has an object-side surface 1021 being convex at a paraxial region thereof, and has an image-side surface 1022 being concave at a paraxial region thereof and being convex at a peripheral region thereof. The second lens element 1020 is made of plastic material, and has the object-side surface 1021 and the image-side surface 1022 both being aspheric.

The third lens element 1030 with positive refractive power has an object-side surface 1031 being concave at a paraxial region thereof and an image-side surface 1032 being convex at a paraxial region thereof. The third lens element 1030 is made of plastic material, and has the object-side surface 1031 and the image-side surface 1032 both being aspheric.

The fourth lens element 1040 with negative refractive power has an object-side surface 1041 being concave at a paraxial region thereof and an image-side surface 1042 being convex at a paraxial region thereof. The fourth lens element 1040 is made of plastic material, and has the object-side surface 1041 and the image-side surface 1042 both being aspheric.

The fifth lens element 1050 with negative refractive power has an object-side surface 1051 being convex at a paraxial region thereof, and has an image-side surface 1052 being concave at a paraxial region thereof and being convex at a peripheral region thereof. The fifth lens element 1050 is made of plastic material, and has the object-side surface 1051 and the image-side surface 1052 both being aspheric.

The IR-cut filter 1070 is made of glass material which located between the fifth lens element 1050 and the image plane 1060, and will not affect the focal length of the image capturing lens assembly.

The detailed optical data of the 10th embodiment are shown in Table 19 and the aspheric surface data are shown in Table 20 below.

TABLE 19

10th Embodiment
f = 2.44 mm, Fno = 2.87, HFOV = 31.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | 0.010 | | | | |
| 2 | Lens 1 | 1.221 | (ASP) | 0.413 | Plastic | 1.544 | 55.9 | 2.06 |
| 3 | | −12.298 | (ASP) | 0.200 | | | | |
| 4 | Lens 2 | 6.041 | (ASP) | 0.200 | Plastic | 1.634 | 23.8 | −2.65 |
| 5 | | 1.298 | (ASP) | 0.167 | | | | |
| 6 | Lens 3 | −10.269 | (ASP) | 0.297 | Plastic | 1.514 | 56.8 | 1.73 |
| 7 | | −0.826 | (ASP) | 0.058 | | | | |
| 8 | Lens 4 | −0.523 | (ASP) | 0.234 | Plastic | 1.650 | 21.4 | −7.35 |
| 9 | | −0.690 | (ASP) | 0.059 | | | | |
| 10 | Lens 5 | 1.095 | (ASP) | 0.415 | Plastic | 1.535 | 55.7 | −5.62 |
| 11 | | 0.645 | (ASP) | 0.400 | | | | |
| 12 | IR-cut filter | Plano | | 0.210 | Glass | 1.517 | 64.2 | — |
| 13 | | Plano | | 0.452 | | | | |
| 14 | Image | Plano | | — | | | | |

Note:
Reference wavelength (d-line) is 587.6 nm.

TABLE 20

Aspheric Coefficients

| Surface # | 2 | 3 | 4 | 5 | 6 |
|---|---|---|---|---|---|
| k = | −2.4776E−01 | 5.0000E+01 | −5.0000E+01 | −8.0145E+00 | −5.0000E+01 |
| A4 = | −8.0990E−02 | −4.6431E−01 | −1.1528E+00 | −3.0430E−01 | −4.5857E−02 |
| A6 = | −1.2994E−01 | −5.3728E−01 | −6.1566E−01 | −4.6808E−01 | −8.2648E−01 |
| A8 = | −2.2998E+00 | −1.0632E+00 | 3.3014E−01 | −4.1666E−01 | 6.0654E+00 |
| A10 = | 5.3896E+00 | 1.6727E+00 | 2.2646E−01 | 8.5200E+00 | −7.2295E+00 |
| A12 = | −6.8400E+00 | 9.2968E−01 | 3.8441E+01 | 3.1111E+01 | −1.8808E+01 |
| A14 = | −3.7376E+01 | −1.5258E+01 | −5.5749E+01 | 3.8151E+01 | 3.7569E+01 |
| A16 = | | | | | −1.4631E+01 |

| Surface # | 7 | 8 | 9 | 10 | 11 |
|---|---|---|---|---|---|
| | −5.8068E+00 | −4.5663E+00 | −4.5363E+00 | −4.5597E+00 | −4.7254E+00 |
| A4 = | 1.0969E−01 | 9.7059E−01 | −9.8350E−02 | −1.4534E+00 | −6.5510E−01 |
| A6 = | −4.5555E−01 | −9.0835E−01 | 2.2714E+00 | 3.8499E+00 | 1.2520E+00 |
| A8 = | 3.4511E+00 | 3.8341E+00 | −5.3307E+00 | −7.9004E+00 | −1.9783E+00 |
| A10 = | −4.7163E+00 | −1.8022E+01 | 8.5642E+00 | 1.0982E+01 | 2.0632E+00 |
| A12 = | 5.1063E+00 | 3.8306E+01 | −8.5773E+00 | −8.9425E+00 | −1.3300E+00 |
| A14 = | −4.6864E+00 | −3.8644E+01 | 3.7264E+00 | 3.8511E+00 | 4.7695E−01 |
| A16 = | | 1.4975E+01 | −2.5400E−01 | −6.8194E−01 | −7.2192E−02 |

In the image capturing lens assembly according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following relationships:

| | | | |
|---|---|---|---|
| f (mm) | 2.44 | Td (mm) | 2.043 |
| Fno | 2.87 | ΣCT/Td | 0.76 |
| HFOV (deg.) | 31.8 | (R5 + R6)/(R5 − R6) | 1.17 |
| V2 + V4 | 45.2 | R10/f | 0.26 |
| CT3/CT1 | 0.719 | f3/f1 | 0.839 |
| T12/T23 | 1.198 | f/f5 | −0.434 |
| (T34 + T45)/CT4 | 0.496 | f5/f4 | 0.761 |

Moreover, In the image capturing lens assembly according to the 10th embodiment, when the focal length of the second lens element 1020 is f2, the focal length of the third lens element 1030 is f3, the focal length of the fourth lens element 1040 is f4, and the focal length of the fifth lens element 1050 is f5, the following relationship is satisfied:

$$|f3/fi| < 0.75,$$

wherein i=2, 4, 5.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. An image capturing lens assembly comprising, in order from an object side to an image side:
   a first lens element with positive refractive power having an object-side surface being convex at a paraxial region thereof;

a second lens element with refractive power having an object-side surface being convex at a paraxial region thereof;

a third lens element with positive refractive power;

a fourth lens element with negative refractive power having an object-side surface being concave at a paraxial region thereof and an image-side surface being convex at a paraxial region thereof; and a fifth lens element with negative refractive power having an image-side surface being concave at a paraxial region thereof and being convex at a peripheral region thereof, wherein an object-side surface and the image-side surface of the fifth lens element are aspheric;

wherein a focal length of the first lens element is f1, a focal length of the third lens element is f3, a focal length of the fourth lens element is f4, a focal length of the fifth lens element is f5, an axial distance between the third lens element and the fourth lens element is T34, an axial distance between the fourth lens element and the fifth lens element is T45, a central thickness of the fourth lens element is CT4, and the following relationships are satisfied:

$$0 < f3/f1 < 0.85;$$

$$0 < f5/f4 < 0.85; \text{ and}$$

$$0 < (T34 + T45)/CT4 < 0.75.$$

2. The image capturing lens assembly of claim 1, wherein the second lens element has an image-side surface being concave at a paraxial region thereof, and the third lens element has an image-side surface being convex at a paraxial region thereof.

3. The image capturing lens assembly of claim 2, wherein the second lens element has negative refractive power.

4. The image capturing lens assembly of claim 3, wherein a focal length of the image capturing lens assembly is f, a curvature radius of the image-side surface of the fifth lens element is R10, and the following relationship is satisfied:

$$0.1 < R10/f < 0.5.$$

5. The image capturing lens assembly of claim 3, wherein the focal length of the fourth lens element is f4, the focal length of the fifth lens element is f5, and the following relationship is satisfied:

$$0 < f5/f4 < 0.70.$$

6. The image capturing lens assembly of claim 5, wherein the focal length of the third lens element is f3, the focal length of the i-th lens element is fi, wherein i-th lens element can be the first, second, fourth, or fifth lens element, and the following relationship is satisfied:

$$|f3/fi| < 0.75,$$

wherein i=1, 2, 4, 5.

7. The image capturing lens assembly of claim 5, wherein a focal length of the image capturing lens assembly is f, the focal length of the fifth lens element is f5, and the following relationship is satisfied:

$$-1.7 < f/f5 < -0.6.$$

8. The image capturing lens assembly of claim 5, wherein an Abbe number of the second lens element is V2, an Abbe number of the fourth lens element is V4, and the following relationship is satisfied:

$$30 < V2 + V4 < 65.$$

9. The image capturing lens assembly of claim 1, wherein the second lens element has an image-side surface being concave at a paraxial region thereof and being convex at a peripheral region thereof, and the object-side surface and the image-side surface of the second lens element are aspheric.

10. The image capturing lens assembly of claim 9, wherein the focal length of the first lens element is f1, the focal length of the third lens element is f3, and the following relationship is satisfied:

$$0 < f3/f1 < 0.75.$$

11. The image capturing lens assembly of claim 1, wherein a sum of central thicknesses of the first lens element, the second lens element, the third lens element, the fourth lens element and the fifth lens element is $\Sigma CT$, an axial distance between the object-side surface of the first lens element and the image-side surface of the fifth lens element is Td, and the following relationship is satisfied:

$$0.75 < \Sigma CT/Td < 0.92.$$

12. The image capturing lens assembly of claim 11, wherein the central thickness of the first lens element is CT1, the central thickness of the third lens element is CT3, and the following relationship is satisfied:

$$0.4 < CT3/CT1 < 1.0.$$

13. The image capturing lens assembly of claim 1, wherein an axial distance between the object-side surface of the first lens element and the image-side surface of the fifth lens element is Td, and the following relationship is satisfied:

$$1.5 \text{ mm} < Td < 3.0 \text{ mm}.$$

14. The image capturing lens assembly of claim 2, further comprising:

a stop located between an object and the first lens element.

15. An image capturing lens assembly comprising, in order from an object side to an image side:

a first lens element with positive refractive power having an object-side surface being convex at a paraxial region thereof and an image-side surface being concave at a paraxial region thereof;

a second lens element with refractive power;

a third lens element with positive refractive power;

a fourth lens element with negative refractive power having an object-side surface being concave at a paraxial region thereof and an image-side surface being convex at a paraxial region thereof; and a fifth lens element with negative refractive power having an object-side surface being convex at a paraxial region thereof, and an image-side surface being concave at a paraxial region thereof and being convex at a peripheral region thereof, wherein the object-side surface and the image-side surface of the fifth lens element are aspheric;

wherein a focal length of the first lens element is f1, a focal length of the third lens element is f3, a focal length of the fourth lens element is f4, a focal length of the fifth lens element is f5, an axial distance between the first lens element and the second lens element is T12, an axial distance between the second lens element and the third lens element is T23, a central thickness of the first lens element is CT1, a central thickness of the third lens element is CT3, and the following relationships are satisfied:

$$0 < f3/f1 < 0.75;$$

$$0 < f5/f4 < 0.85;$$

$0 < T12/T23 < 1.20$; and $0.1 < CT3/CT1 < 1.20$.

16. The image capturing lens assembly of claim 15, wherein the third lens element has an image-side surface being convex at a paraxial region thereof.

17. The image capturing lens assembly of claim 16, wherein the focal length of the third lens element is f3, the focal length of the i-th lens element is fi, wherein i-th lens element can be the first, second, fourth, or fifth lens element, and the following relationship is satisfied:

$|f3/fi| < 0.75$, wherein i=1, 2, 4, 5.

18. The image capturing lens assembly of claim 16, wherein a focal length of the image capturing lens assembly is f, a curvature radius of the image-side surface of the fifth lens element is R10, and the following relationship is satisfied:

$0.1 < R10/f < 0.5$.

19. The image capturing lens assembly of claim 16, wherein the axial distance between the first lens element and the second lens element is T12, the axial distance between the second lens element and the third lens element is T23, and the following relationship is satisfied:

$0.1 < T12/T23 < 1.0$.

20. The image capturing lens assembly of claim 16, wherein a curvature radius of an object-side surface of the third lens element is R5, a curvature radius of the image-side surface of the third lens element is R6, and the following relationship is satisfied:

$0.80 < (R5+R6)/(R5-R6) < 1.70$.

21. The image capturing lens assembly of claim 15, wherein a sum of central thicknesses of the first lens element, the second lens element, the third lens element, the fourth lens element and the fifth lens element is $\Sigma CT$, an axial distance between the object-side surface of the first lens element and the image-side surface of the fifth lens element is Td, and the following relationship is satisfied:

$0.75 < \Sigma CT/Td < 0.92$.

22. The image capturing lens assembly of claim 15, wherein the second lens element with negative refractive power has an object-side surface being convex at a paraxial region thereof and an image-side surface being concave at a paraxial region thereof.

\* \* \* \* \*